United States Patent
Wang et al.

(10) Patent No.: US 12,422,610 B2
(45) Date of Patent: Sep. 23, 2025

(54) DISPLAY MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yaodong Wang, Beijing (CN); Yangli Zheng, Beijing (CN); Xiaoping Zhang, Beijing (CN); Jian Ren, Beijing (CN); Luo Zhang, Beijing (CN); Tianyang Han, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/701,583

(22) PCT Filed: Dec. 26, 2022

(86) PCT No.: PCT/CN2022/141865
§ 371 (c)(1),
(2) Date: Apr. 15, 2024

(87) PCT Pub. No.: WO2023/138309
PCT Pub. Date: Jul. 27, 2023

(65) Prior Publication Data
US 2025/0231440 A1    Jul. 17, 2025

(30) Foreign Application Priority Data

Jan. 24, 2022   (CN) .......................... 202210079805.4

(51) Int. Cl.
*G02F 1/00*   (2006.01)
*G02F 1/1335*   (2006.01)
(Continued)

(52) U.S. Cl.
CPC .. *G02F 1/133615* (2013.01); *G02F 1/133512* (2013.01); *G02F 1/133528* (2013.01); *G02F 1/1339* (2013.01)

(58) Field of Classification Search
CPC ......... G02F 1/133615; G02F 1/133512; G02F 1/133528; G02F 1/1339
See application file for complete search history.

(56) References Cited

U.S. PATENT DOCUMENTS

| 10,018,778 B2 | 7/2018 | Kim | |
| 2003/0063456 A1* | 4/2003 | Katahira | G02B 6/0046 |
| | | | 362/616 |

(Continued)

FOREIGN PATENT DOCUMENTS

| CN | 202150000 U | 2/2012 |
| CN | 103792729 A | 5/2014 |

(Continued)

OTHER PUBLICATIONS

International Search Report and Written Opinion for Application No. PCT/CN2023/071561, dated Mar. 29, 2023, 8 Pages.

(Continued)

*Primary Examiner* — Gerald J Sufleta, II
(74) *Attorney, Agent, or Firm* — BROOKS KUSHMAN P.C.

(57) ABSTRACT

A display module includes a transparent cover plate, an optical adhesive layer, a display panel and a backlight module arranged sequentially. A side edge of the display module includes a first contour edge on a same side as a first side edge of the display panel on the display module and a plurality of second contour edges other than the first contour edge. The display module further includes a side adhesive, and the side adhesive is arranged on a side of at least one of the second contour edges away from a center of the display panel. The side adhesive extends from the transparent cover (Continued)

plate to the backlight module, and the side adhesive is adhered to a side surface of the display panel, a side surface of the backlight module and a side surface of the transparent cover plate facing the display panel.

20 Claims, 10 Drawing Sheets

(51) Int. Cl.
*G02F 1/13357* (2006.01)
*G02F 1/1339* (2006.01)

(56) References Cited

U.S. PATENT DOCUMENTS

| | | | |
|---|---|---|---|
| 2005/0286854 | A1 | 12/2005 | Honma |
| 2015/0092385 | A1* | 4/2015 | Baek .................. G02B 6/0091 |
| | | | 362/19 |
| 2017/0184784 | A1* | 6/2017 | Kim .................. G02B 6/0088 |
| 2022/0163838 | A1* | 5/2022 | Lin .................. G02F 1/133512 |

FOREIGN PATENT DOCUMENTS

| | | |
|---|---|---|
| CN | 204667010 U | 9/2015 |
| CN | 104965255 A | 10/2015 |
| CN | 106932957 A | 7/2017 |
| CN | 107045409 A | 8/2017 |
| CN | 107272262 A | 10/2017 |
| CN | 206741160 U | 12/2017 |
| CN | 207516697 U | 6/2018 |
| CN | 110109218 A | 8/2019 |
| CN | 110333628 A | 10/2019 |
| CN | 209606651 U | 11/2019 |
| CN | 211669475 U | 10/2020 |
| CN | 113075807 A | 7/2021 |
| CN | 213904010 U | 8/2021 |
| CN | 113721388 A | 11/2021 |
| CN | 215576011 U | 1/2022 |
| CN | 217587811 U | 10/2022 |
| JP | 2009053472 A | 3/2009 |
| WO | 2019100318 A1 | 5/2019 |

OTHER PUBLICATIONS

First Office Action for U.S. Appl. No. 18/286,463, dated May 17, 2024, 15 Pages.
First Chinese Office Action for Chinese Application No. 202280005267.2 mailed Apr. 24, 2025. 20 pages.

* cited by examiner

DISPLAY MODULE AND DISPLAY DEVICE

CROSS-REFERENCE TO RELATED APPLICATIONS

This application is the U.S. national phase of PCT Application No. PCT/CN2022/141865 filed on Dec. 26, 2022, which claims priority to Chinese Patent Application No. 202210079805.4 filed on Jan. 24, 2022, which are incorporated herein by reference in their entireties.

TECHNICAL FIELD

Embodiments of the present disclosure relate to the field of display technology, in particular to a display module and a display device.

BACKGROUND

With the development of display technology, the application range of liquid crystal display products is broader. The liquid crystal display product mainly includes a display panel and a backlight module. The backlight module is used for providing backlight for the display panel, so as to ensure a normal display function of the display panel. In order to improve a screen-to-body ratio of a display module, it is usually necessary to narrow a frame of the display module.

SUMMARY

In a first aspect, embodiments of the present disclosure provide a display module including a transparent cover plate, an optical adhesive layer, a display panel and a backlight module arranged sequentially. A side edge of the display module includes a first contour edge on a same side as a first side edge of the display panel on the display module and a plurality of second contour edges other than the first contour edge, and the first side edge of the display panel is on a side where a data input end of the display panel is located. The display module further includes a side adhesive, and the side adhesive is arranged on a side of at least one of the second contour edges away from a center of the display panel. The side adhesive extends from the transparent cover plate to the backlight module, and the side adhesive is adhered to a side surface of the display panel, a side surface of the backlight module and a side surface of the transparent cover plate facing the display panel.

In some embodiments, on a side where at least one of the second contour edges is located, an edge of the transparent cover plate protrudes with respect to a corresponding second contour edge of the display panel, and the side adhesive is located on a side of the transparent cover plate close to the display panel.

In some embodiments, the display module includes one or more second light-shielding layers located between the display panel 40 and the backlight module 60, the second light-shielding layers are arranged at the second contour edges respectively and in contact with the backlight module, and a contact width is greater than or equal to 0.15 mm.

In some embodiments, a side edge of the display panel at a side where at least one the second contour edge is located is indented inwardly relative to an outer contour of the backlight module, and a length of the backlight module protruding from the display panel is less than or equal to 0.15 mm.

In some embodiments, on at least one of the second contour edges, the side adhesive covers an end portion of the display panel with a width in a range of 0.15 mm to 0.25 mm.

In some embodiments, an orthographic projection of an edge of the backlight module corresponding to a side where at least one second contour edge is located onto an extending plane of the transparent cover plate is closer to the second contour edge of the display module than an orthographic projection of an edge of the second light-shielding layer close to the corresponding second contour edge onto the extending plane of the transparent cover plate, and the second light-shielding layer is indented inwardly by 0.05 mm or less relative to the backlight module.

In some embodiments, in a direction perpendicular to the transparent cover plate, a length of an overlapping region between the side adhesive and the backlight module is greater than or equal to half a thickness of the backlight module.

In some embodiments, a thickness of the second light-shielding layer is in the range of 0.027 mm to 0.033 mm.

In some embodiments, the display panel includes a first substrate, a second substrate and a sealant located between the first substrate and the second substrate. The data input end is located on the first substrate. The display panel includes a support structure, and the support structure is located on a side of the sealant away from a display region of the display panel.

In some embodiments, the second substrate includes a first edge, the first substrate includes a second edge, both the first edge and the second edge are located at the first side edge of the display panel, and the first edge is closer to the display region of the display panel than the second edge. A boundary of the support structure away from the display region of the display panel is flush with the first edge.

In some embodiments, a distance between the second edge and the boundary of the support structure close to the sealant in a direction perpendicular to the second edge on an extending plane of the display panel is greater than or equal to 0.05 mm.

In some embodiments, a distance between the first edge and the sealant is in the range of 0.05 mm to 0.12 mm.

In some embodiments, the support structure is disposed in contact with the first substrate and the second substrate.

In some embodiments, a thickness of the display panel is less than 0.25 mm.

In some embodiments, the display module includes a first polarizer located between the optical adhesive layer and the display panel. The display panel includes a first substrate and a second substrate, and the data input end is located on the first substrate. The display panel further includes a conductive paste layer, and the conductive paste layer is electrically connected to an end surface of the first polarizer at the first side edge and the first substrate. A thickness of the conductive paste layer at a position where the conductive paste layer is in contact with the end surface of the first polarizer at the first side edge is greater than a thickness of the first polarizer.

The conductive paste layer includes one strip-shaped conductive paste portion, or a plurality of planar conductive paste portions, or one or more point-shaped conductive paste portions. Each conductive paste portion includes a first conductive paste part and a second conductive paste part which are electrically connected to each other, and both the first conductive paste part and the second conductive paste part are located at one side of the first substrate away from the backlight module. The first conductive paste part is electrically connected to the first substrate, and the second conductive paste part is located on a side of the second substrate away from the first substrate and is arranged in contact with the end surface of the first polarizer at the first side edge.

The strip-shaped conductive paste portion includes a continuously strip-shaped second conductive paste part, and the second conductive paste part is arranged in contact with most positions of the end surface of the first polarizer at the first side edge. A length of at least one planar conductive paste portion in contact with the end surface of the first polarizer at the first side edge is in the range of 2 mm-5 mm. A length of the point-shaped conductive paste portion in contact with the end surface of the first polarizer at the first side edge is less than or equal to 1.05 mm.

In some embodiments, a distance between an orthographic projection of the end surface of the first polarizer at the first side edge onto the display panel and a boundary of a light-exiting region of the cover plate at the same side is greater than or equal to 1.05 mm, and the conductive paste layer includes at least one of the strip-shaped conductive paste portion and the planar conductive paste portions.

In some embodiments, a distance between an orthographic projection of the end surface of the first polarizer at the first side edge onto the display panel and a boundary of a light-exiting region of the cover plate at the same side is greater than or equal to 0.9 mm and less than 1.05 mm, and the conductive paste layer only includes the planar conductive paste portions.

In some embodiments, the conductive paste layer only includes two planar conductive paste portions close to a side edge of the display panel adjacent to the first side edge and another side edge of the display panel adjacent to the first side edge, respectively.

In some embodiments, a distance between an orthographic projection of the end surface of the first polarizer at the first side edge onto the display panel and a boundary of a light-exiting region of the cover plate at the same side is less than 0.9 mm, and the conductive paste layer only includes the point-shaped conductive paste portion.

In some embodiments, the conductive paste layer only includes two point-shaped conductive paste portions close to a side edge of the display panel adjacent to the first side edge and another side edge of the display panel adjacent to the first side edge, respectively. The display module includes a conductive member and a flexible circuit board, the flexible circuit board is electrically connected to the data input end, and the conductive member is electrically connected to the point-shaped conductive paste portion and the flexible circuit board. The conductive member includes a conductive copper foil.

In some embodiments, a thickness of the optical adhesive layer is less than or equal to 0.15 mm.

In some embodiments, a distance from an orthographic projection of the optical adhesive layer onto the display panel relative to a corresponding boundary of a display region of the display panel at the side where the first side edge is located to a boundary of a light-exiting region of the cover plate at the same side is greater than or equal to 0.232 mm and less than or equal to 0.6 mm.

In a second aspect, embodiments of the present disclosure provide a display device including the above-mentioned display module.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Apparently, the following drawings merely relate to some embodiments of the present disclosure, and based on these drawings, a person of ordinary skill in the art may obtain other drawings without any creative effort.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

Embodiments of the present disclosure provide a display module.

The display module may be applied to any product or member with a display function, such as a television, a display, a digital photo frame, a mobile phone and a tablet computer.

Figure 1:
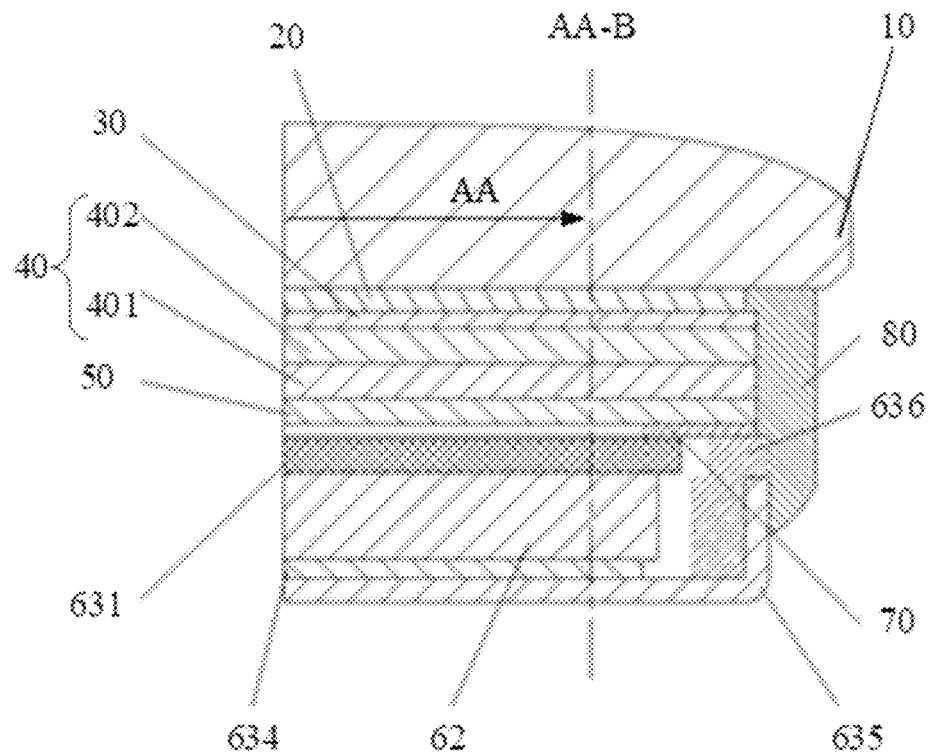
FIG. 1 is a schematic view showing a display module according to one embodiment of the present disclosure.

As shown in FIG. 1, in one embodiment, the display module includes a transparent cover plate 10, an optical adhesive layer 20, a display panel 40 and a backlight module (BLU) 60 laminated one on another sequentially.

In one embodiment, the first polarizer 30 is arranged between the optical adhesive layer 20 and the display panel 40.

In one embodiment, the second polarizer 50 is arranged between the display panel and the backlight module 60.

In one embodiment, the backlight module 60 includes a light source structure and a light guide plate 62, the light source structure is located on a side of the light guide plate 62, in other words, the backlight module 60 is an edge-type backlight module 60, so as to reduce a thickness of the backlight module 60, thereby to reduce the overall thickness of the display module.

The display panel 40 includes a first substrate 401 and a second substrate 402 arranged in a laminated manner, the first substrate 401 is located on a side of the second substrate 402 close to the backlight module 60. The display panel 40 includes a data input end (Display Port interface, DP). The side of the display panel 40 having the data input end is referred to as a DP side. For example, the data input end is located on the first substrate 401. For example, the flexible circuit board 81 is electrically connected to (e.g., bound to) the data input end for transmitting signals to the display panel. The data input end and the light source structure may be located on a same side of the display module.

For example, the first polarizer 30 is located on a side of the second substrate 402 away from the first substrate 401. For example, the first polarizer 30 is attached to the second substrate 402.

For example, the second polarizer 50 is located on a side of the first substrate 401 away from the second substrate 402. For example, the second polarizer 50 is attached to the first substrate 401.

For example, the first substrate 401 is an array substrate.

For example, the second substrate 402 is a color film substrate.

For example, the display panel 40 is a liquid crystal display panel including a liquid crystal layer between the first substrate 401 and the second substrate 402.

It should be appreciated that a size of a frame of the display module corresponding to the DP side may be designed to be larger than a frame size of any one of other side edges since a bonding region needs to be provided on a side of the display module close to a signal input end. In some embodiments, the DP side may also be a light-entering side of the backlight module 60 or a side of the display module provided with the light source structure.

The display module has a display region AA and a non-transparent region UVA surrounding the display region AA, and side edges of the display module include a first contour edge on the same side of the display module as the DP side and a plurality of second contour edges apart from the first contour edge. Preferably, both the light source structure and the DP side are located on the side where the first contour edge of the display module is located. It should be appreciated that an orthographic projection of the display region AA of the display module onto the display panel 40 coincides with the display region of the display panel.

For example, when an outer contour of the display region has a rectangular shape, the quantity of second contour edges is three. The rectangular shape may include a rectangular shape with rounded corners, i.e., at least one of the four corners of the rectangular shape is rounded. An illustration is given by taking a case where the display panel 40 has a rectangular shape as an example, the DP side is a first side edge of the display panel 40, and other side edges of the display panel 40 is second side edges, the second side edges specifically include a side edge opposite to the DP side (also referred to as a DPO side) and two side edges between the DP side and the DPO side.

Apparently, in a case that the shape of the display panel 40 is changed to a different shape, e.g., a triangular, a circular, etc. positions of the first contour edge and the second contour edges are adapted too, which will not be particularly defined herein.

As shown in FIG. 1, the display module further includes a side adhesive 80, the side adhesive 80 is arranged on a side of at least one second contour edge away from the center of the display panel 40. For example, in a case where the display module having a rectangular shape includes three second contour edges, one or more side edges of the three second contour edges are applied with the side adhesive 80 on the side away from the center of the display panel 40. In a preferred embodiment, the side adhesive 80 may be applied on each side of the second contour edges away from the center of the display panel 40. For example, to prevent light leakage, the side adhesive 80 may be non-transparent. For example, the side adhesive 80 has a black color. For example, the side adhesive 80 is made of a moisture-curable polyurethane structural adhesive. Preferably, the adhesive has a viscosity in the range of 1500 CPS to 2500 CPS.

The side adhesive 80 extends from the transparent cover plate 10 to the backlight module 60, and the side adhesive 80 is adhered to a side surface of the display panel 40, a side surface of the backlight module 60 and a side surface of the transparent cover plate 10 facing the display panel 40.

In some of these embodiments, the side adhesive 80 is tightly adhered to the side surface of the display panel 40, the side surface of the backlight module 60, and the side surface of the transparent cover plate 10 facing the display panel 40, thereby to increase the adhesive strength of the side adhesive 80.

In a specific embodiment, on a side where at least one second contour edge is located, an edge of the transparent cover plate 10 protrudes beyond the second contour edge of the display panel 40, i.e., an orthographic projection of the second contour edge onto an extending plane of the transparent cover plate 10 is located on the transparent cover plate 10. The side adhesive 80 is located on a side of the transparent cover plate 10 close to the display panel 40.

In the embodiment of the present disclosure, through the side adhesive 80, it is able to improve the secure and adhesion effects among the transparent cover plate 10, the display panel 40 and the backlight module 60, so as to reduce the possibility of light leakage at side edges of the display module, thereby to improve the reliability of the display module. In different use states and test states, such as a high temperature and high humidity test and a drop test, the display panel 40 and the backlight module 60 still have a good adhesion effect, thereby to reduce the possibility of light exiting at side edges.

Figure 2:
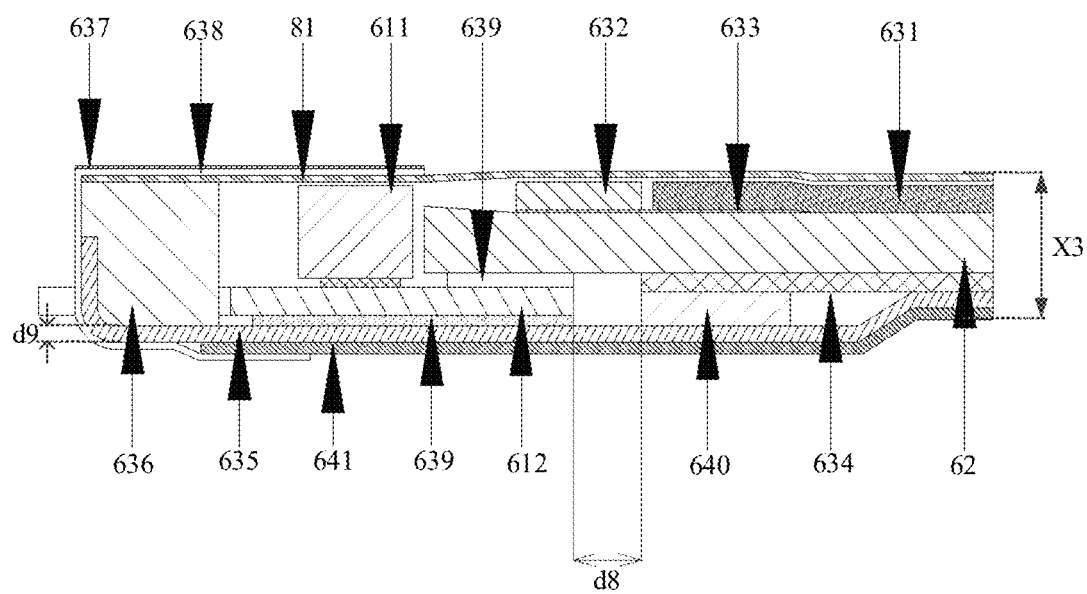
FIG. 2 is a schematic sectional view of a backlight module according to one embodiment of the present disclosure.
Figure 3:
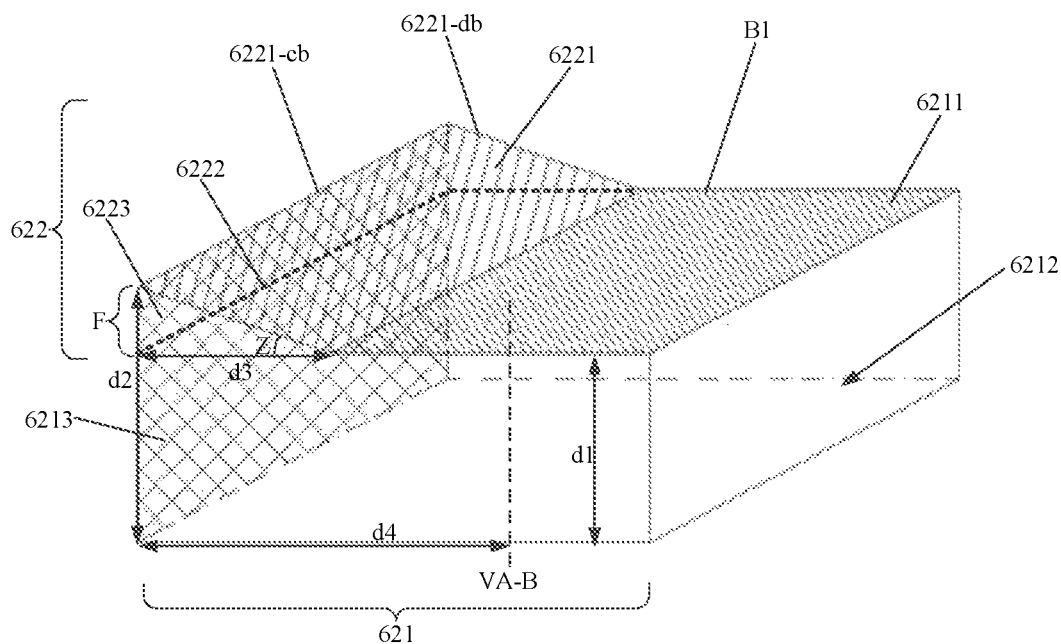
FIG. 3 is a schematic view showing a light guide plate according to one embodiment of the present disclosure.
Figure 9:
FIG. 9 is a schematic diagram of the flatness according to one embodiment of the present disclosure.

With reference to FIGS. 2, 3 and 9, the backlight module 60 includes a light source structure and a light guide plate 62.

The light guide plate 62 includes a body structure 621 and a wedge-shaped structure 622 disposed on the body structure 621 at a side close to the light source structure.

The body structure 621 includes a light-entering surface 6213 of the body structure, the wedge-shaped structure 622 includes a bottom surface 6222 arranged in surface-to-surface contact with the body structure 621, a wedge-shaped surface 6221 and a light-entering surface 6223 of the wedge-shaped structure. The light-entering surface 6223 of the wedge-shaped structure, the wedge-shaped surface 6221 and the bottom surface 6222 constitute a protrusion on the body structure 621, and a thickness of the wedge-shaped structure 622 gradually decreases in a direction from the light-entering surface 6213 of the body structure, extending along the body structure 621 and away from the light source structure.

The light source structure includes a light source 611 and a carrier 612 bearing the light source. The light-entering surface 6213 of the body structure is located on a side of the body structure 621 facing the light source 611, and the wedge-shaped structure light-entering surface 6223 is located on a side of the wedge-shaped structure 622 facing the light source 611. Light emitted by the light source 611 enter the light guide plate 62 through the light-entering surface 6213 of the body structure and the light-entering surface 6223 of the wedge-shaped structure. In a direction perpendicular to the bottom surface 6222, a ratio of a thickness of the body structure to a thickness of a light source light-exiting surface is less than 88%.

Illustratively, the light guide plate 62 is made of a resin material.

Illustratively, the light guide plate 62 may be formed by using a compression mold with single cavity, or a compression mold with two cavities.

Illustratively, wedge-shaped structure 622 is formed as a one-piece structure with the body structure 621.

Illustratively, the wedge-shaped surface 6221 is connected to a light-exiting surface 6211 of the body structure 621, and the bottom surface 6222 of the wedge-shaped structure 622 is disposed to be in surface-to-surface contact with the light-exiting surface 6211 of the body structure 621.

Illustratively, a side surface of the wedge-shaped structure 622 is connected to a side surface of the body structure 621.

Illustratively, the thickness of the wedge-shaped structure 622 tends to decreases gradually in a direction along which the body structure 621 extends, from the light-entering surface 6213 of the body structure away from the light source structure. Illustratively, in the direction along which the body structure 621 extends, from the light-entering surface 6213 of the body structure away from the light source structure, the thickness of the wedge-shaped structure 622 may be in a negatively correlation with its distance away from the light source structure. Note that in a case that other optical modulation structures are provided on the wedge-shaped structure 622, the negatively correlation may be a not strict linear relationship, but an overall trend for the thickness of the wedge-shaped structure is a negative correlation. A linear correlation is also applicable.

Illustratively, the light source 611 includes a LED light source. Illustratively, the LED light source is a LED having a thickness of 0.4 mm in a direction perpendicular to the carrier 612.

Illustratively, at least a portion of the carrier 612 is located on a side of the body structure 621 away from the wedge-shaped surface 6221. At least a portion of the carrier 612 is located on a side of the light guide plate 62 away from the light-exiting surface 6211. The carrier 612 is adhered to a non-light-exiting surface 6212 (i.e., a surface of the light guide plate 62 away from the light-exiting surface 6211) through a light bar adhesive 639.

Illustratively, the bottom surface 6222 is in surface-to-surface contact with the light-exiting surface 6211, i.e., a portion of the light-exiting surface 6211 may be considered as the bottom surface 6222. It should be appreciated that when the wedge-shaped structure 622 is formed as a one-piece structure with the body structure 621, there is no distinct interface between the wedge-shaped structure 622 and the body structure 621, and the bottom surface 6222 and the light-exiting surface which is in surface-to-surface contact with the bottom surface 6222 are defined for illustration purpose.

Figure 8:
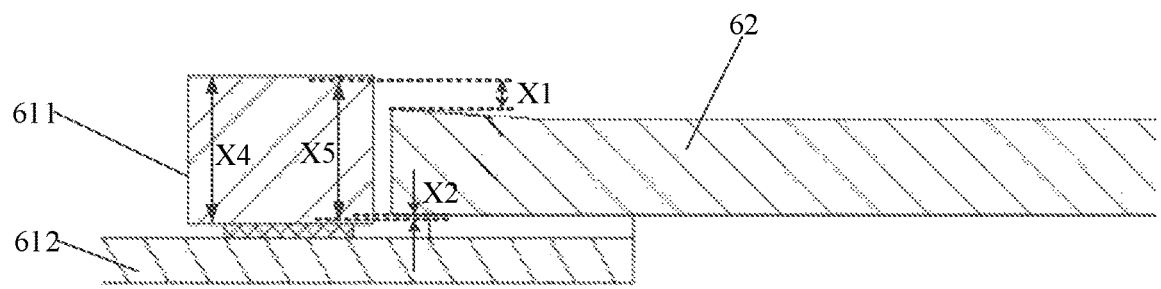
FIG. 8 is a schematic view showing a light source structure and a light guide plate according to one embodiment of the present disclosure.

As shown in FIG. 8, on a light-exiting side of the light guide plate 62, a height of the light source light-exiting surface protruding with respect to the wedge-shaped structure 622 of the light guide plate 62 is X1, and on a side of the light guide plate 62 opposite to the light-exiting side, a height of the light source light-exiting surface protruding with respect to the body structure 621 of the light guide plate 62 is X2. An overall thickness of the light source is X4. A height of the light-exiting surface of the light source is X5.

Note that the overall thickness of the light source refers to a thickness of the light source including a housing.

In the backlight module 60 of the embodiments of the present disclosure, the light guide plate 62 includes the wedge-shaped structure 622 and the body structure 621, it is able to effectively reduce an overall thickness of the backlight module 60 in a direction perpendicular to the bottom surface 6222 through thinning the body structure 621. In addition, when the light guide plate 62 includes the wedge-shaped structure 622 and the body structure 621, in the direction perpendicular to the bottom surface 6222, the ratio of the thickness of the body structure to the thickness of the light source light-exiting surface is less than 88%, so that the light emitted by the light source may enter the wedge-shaped structure 622 to a greater extent, and is further transmitted from the wedge-shaped structure to the body structure, thereby ensuring a light-entering rate of a light-entering surface of the light guide plate 62, improving the light efficiency utilization rate, and ensuring that the wedge-shaped structure 622 has a well matching with a size of a light-exiting portion of the light source 611.

As shown in FIGS. 2 and 3, in some embodiments, at least a portion of the carrier 612 is disposed on a side of the body structure 621 away from the bottom surface 6222.

With the above-mentioned arrangement, the carrier 612 can be adhered to the flat surface of the light guide plate 62 (namely, the surface of the body structure 621 at a side away from the bottom surface 6222), thereby ensuring that the light source structure is firmly adhered to the light guide plate 62. Since an optical film 631 is arranged on the side where the light-exiting surface 6211 is located, with the above-mentioned arrangement, it is able to avoid the carrier 612 occupying the layout space of the optical film 631, and ensure that the optical film 631 has a sufficient layout space.

As shown in FIG. 3, in some embodiments, a maximum thickness d1 of the body structure 621 in a direction perpendicular to the light-exiting surface 6211 of the body structure 621 meets: 0.24 mm≤d1≤0.32 mm.

A distance d4 between the light-entering surface 6213 of the body structure and a boundary VA-B of the light-exiting region VA of the backlight module 60 meets: d4≤1.65 mm.

Illustratively, d1 satisfies: 0.26 mm≤d1≤0.30 mm.

Illustratively, the thickness d1 of the body structure 621 includes 0.24 mm, 0.25 mm, 0.26 mm, 0.27 mm, 0.28 mm, etc.

Illustratively, the distance d4 between the light-entering surface 6213 of the body structure and the boundary of the light-exiting region of the backlight module 60 includes 1.3 mm, 1.4 mm, 1.5 mm and 1.55 mm, etc.

In the backlight module 60 of the above-mentioned embodiment, d1 and d4 are set in the above-mentioned range, so that the body structure 621 has a relatively thin thickness, thereby facilitating the reduction of the overall thickness of the backlight module 60. In addition, the frame of the backlight module 60 can be made narrower and have a better use experience. It also allows the wedge-shaped structure 622 to have a well matching with the size of the light-exiting portion of the light source 611.

As shown in FIG. 3, in some embodiments, a maximum thickness F of the wedge-shaped structure 622 in a direction perpendicular to the bottom surface 6222 meets: F≤0.04 mm.

In a direction perpendicular to the light-exiting surface 6211 of the body structure 621, a maximum thickness d2 of the light guide plate 62 meets: 0.27 mm≤d2≤0.33 mm.

A length d3 of an orthographic projection of a first edge 6221-db of the wedge-shaped surface 6221 onto the extending plane of the bottom surface 6222 meets: 0.3 mm≤d3≤0.55 mm, and an included angle between the first edge and the light-entering surface of the wedge-shaped structure is greater than 0 degrees.

An included angle Z between the wedge-shaped surface and the bottom surface meets: Z≤4.5°.

Illustratively, the thickness of the light source in the direction perpendicular to the carrier is more than 0.1 mm greater than d1.

Illustratively, the maximum thickness d2 of the wedge-shaped structure 622 includes 0.27 mm, 0.28 mm, 0.29 mm, 0.30 mm, 0.31 mm, etc.

Illustratively, the length d3 of the orthographic projection of the first edge 6221-db of the wedge-shaped surface 6221 onto the extending plane of the bottom surface 6222 includes 0.4 mm, 0.5 mm, etc.

The inventors have found that when d2 and d3 are set in the above range, it is able to provide a better light-exiting effect at a lamp port. As a comparative example, when setting d2=0.29 mm and d3=1 mm, there is a medium bright band at the lamp port between the light source 611 and the light guide plate 62. When setting d2=0.34 mm and d3=0.4 mm, there is a vertical bar shadow at the lamp port. When setting d2=0.36 mm and d3=0.4 mm, there is a vertical bar dark shadow at the lamp port. When setting d2=0.36 mm and d3=1 mm, there is an abnormal lamp eye phenomenon at the lamp port.

Figure 4:
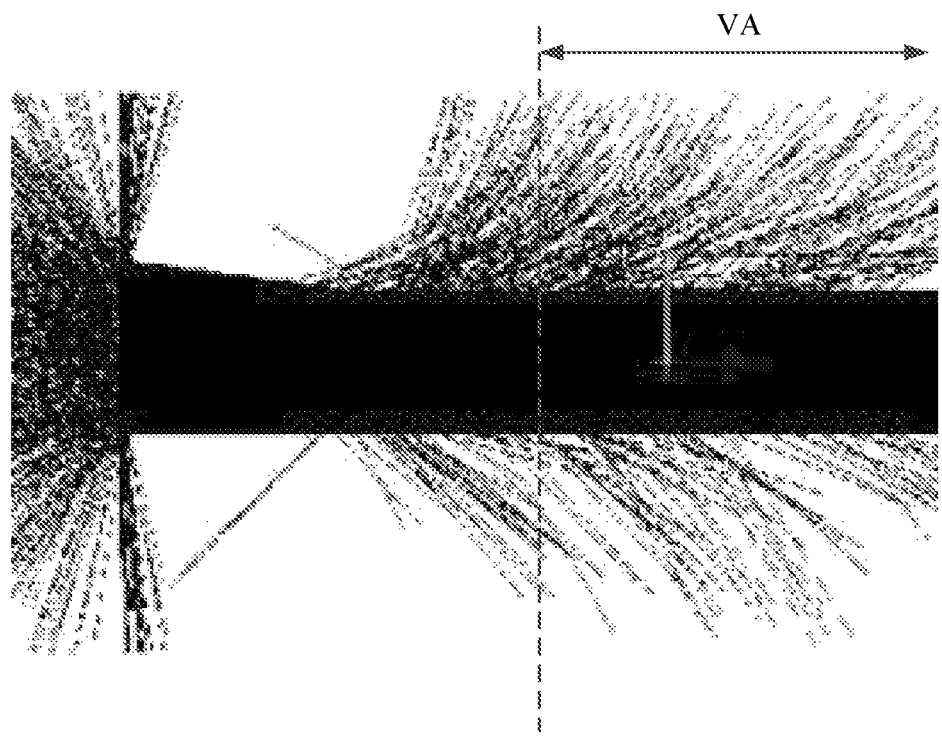
FIG. 4 is a view showing an effect at a port when a maximum level difference formed by a wedge-shaped surface is 0.1 mm in the related art.
Figure 5:
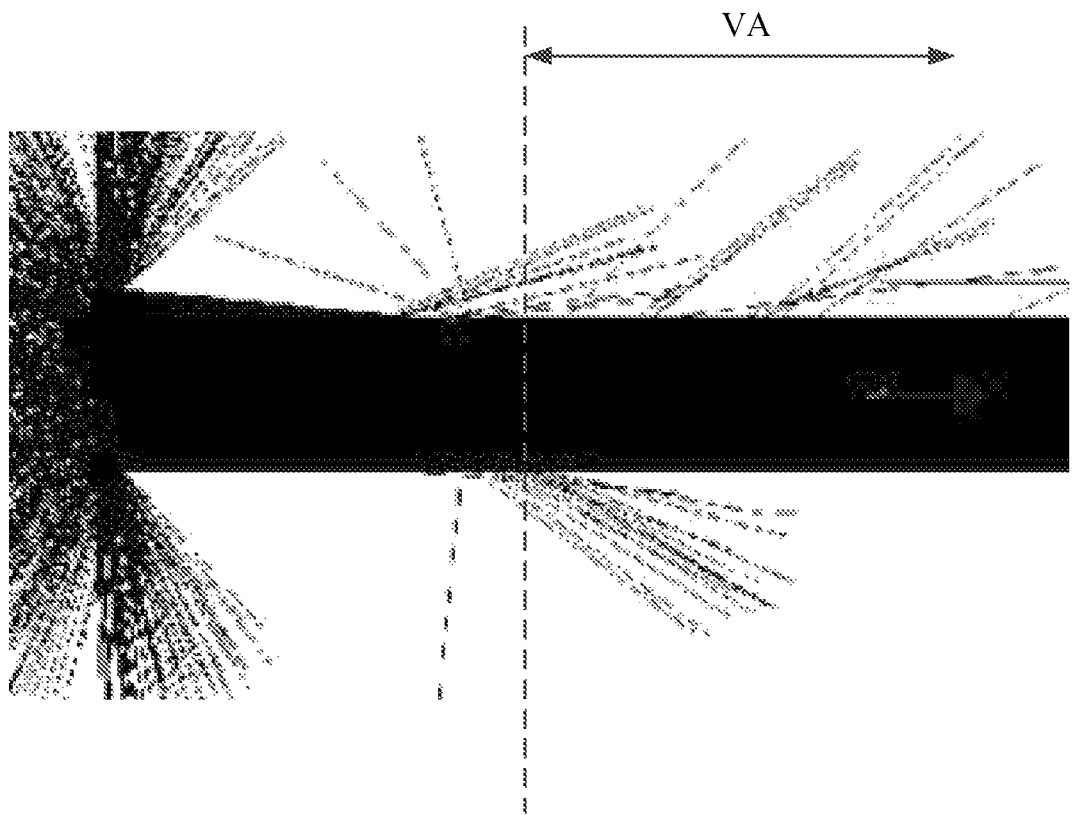
FIG. 5 is a view showing an effect at a port when a maximum level difference formed by a wedge-shaped is 0.03 mm according to one embodiment of the present disclosure.

FIG. 4 is a diagram showing a lamp port effect corresponding to a case where a maximum level difference formed by the wedge-shaped surface is 0.1 mm in the related art. FIG. 5 is a diagram showing a lamp port effect corresponding to a case where a maximum level difference formed by the wedge-shaped surface is 0.03 mm according to an embodiment of the present disclosure. Note that the test conditions of FIG. 4 and FIG. 5 are the same.

In FIG. 4, a large amount of light emitted by the light source 611 is emitted to the light-exiting surface 6211 of the light guide plate 62 before entering the light-exiting region VA of the backlight module 60 (VA-B is a boundary of the light-exiting region VA), resulting in uneven brightness and darkness at the lamp port. In FIG. 5, the light emitted by the light source 611 is not emitted to the light-exiting surface 6211 of the light guide plate 62 in large amount before entering the light-exiting region VA of the backlight module 60, so as to ensure an optimal lamp port effect, and the phenomenon of uneven brightness and darkness at the lamp port does not occur.

It should be noted that there is a positive correlation between the brightness and intensity of the emitted light. Thus, in FIG. 4, there is a greater brightness in the vicinity of the lamp port than FIG. 5.

The light guide plate 62 is set according to the parameters described above, so that the wedge-shaped structure 622 is well matched with the size of the light-exiting of the light source 611. In addition, the level difference between the wedge-shaped surface 6221 and the light-exiting surface 6211 is controlled to be within a reasonable range in the above-mentioned arrangement manner, so that the light emitted by the light source 611 will not be emitted to the light-exiting surface 6211 of the light guide plate 62 in large amount before entering the light-exiting region VA of the backlight module 60, thereby to ensure an optimal lamp port effect, and avoid the phenomenon of uneven brightness and darkness at the lamp port.

Figure 6A:
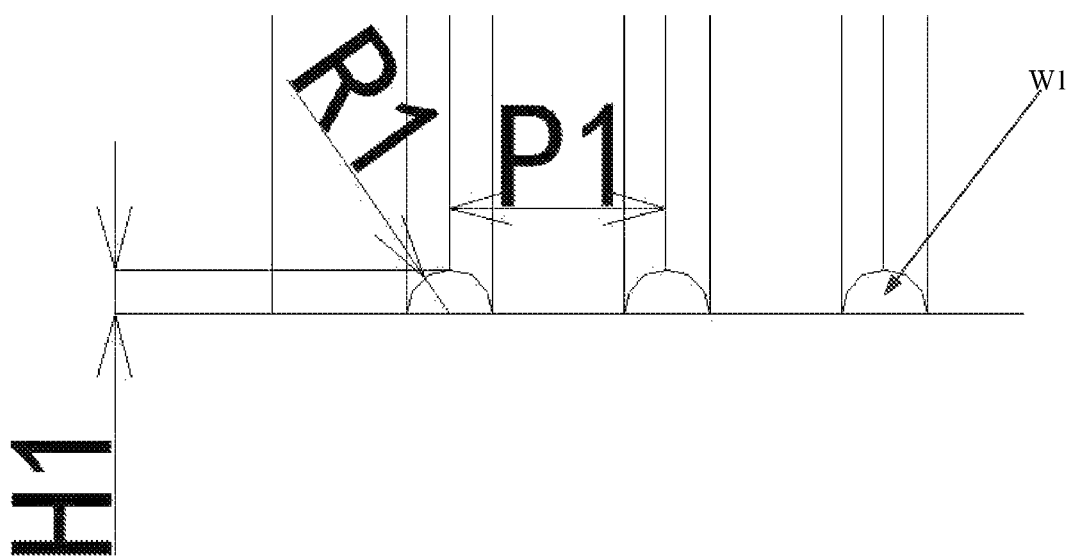
FIG. 6a is a schematic view showing a size and arrangement of a first microstructure according to one embodiment of the present disclosure.

As shown in FIGS. 3 and 6a, in some embodiments, multiple first microstructures W1 are disposed on the light-exiting surface 6211 of the body structure 621, the multiple first microstructures W1 are arranged along a direction of parallel to the light-entering surface 6213 of the body structure (e.g., a direction in which the second edge 6221-cb extends), and each first microstructure W1 on the light-exiting surface 6211 of the body structure extends in a direction perpendicular to the direction in which the first microstructures W1 are arranged.

A cross section of the first microstructure W1, in the direction along which the first microstructures W1 are arranged and in the direction perpendicular to the light-exiting surface 6211, is a first arc shape, and a radius R1 of the first arc shape meets: 80 μm≤R1≤100 μm.

A distance P1 between centers of two adjacent first microstructures W1 meets: 140 μm≤P1≤160 μm.

A maximum height H1 of the first microstructure W1 in a direction perpendicular to the light-exiting surface 6211 meets: 2.2 μm≤H1≤2.6 μm.

Illustratively, the radius R1 of the first arc shape includes: 85 μm, 90 μm and 95 μm, etc.

Illustratively, the distance P1 between the centers of two adjacent first microstructures W1 includes: 145 μm, 150 μm and 155 μm, etc.

Illustratively, the maximum height H1 of the first microstructure W1 in the direction perpendicular to the light-exiting surface 6211 includes: 2.3 mm, 2.4 μm and 2.5 μm, etc.

Illustratively, the first microstructure W1 protrudes above the light-exiting surface 6211.

Illustratively, the first microstructure W1 is formed as a one-piece structure with the light guide plate 62.

When the multiple first microstructures W1 are arranged on the light-exiting surface 6211 in the above-mentioned layout manner, it is beneficial to multi-angle reflection and refraction of light, and facilitate a uniformity in light distribution. As such, the backlight module 60 can achieve a multi-angle and high-efficiency light-exiting in the light-exiting region.

Figure 6B:
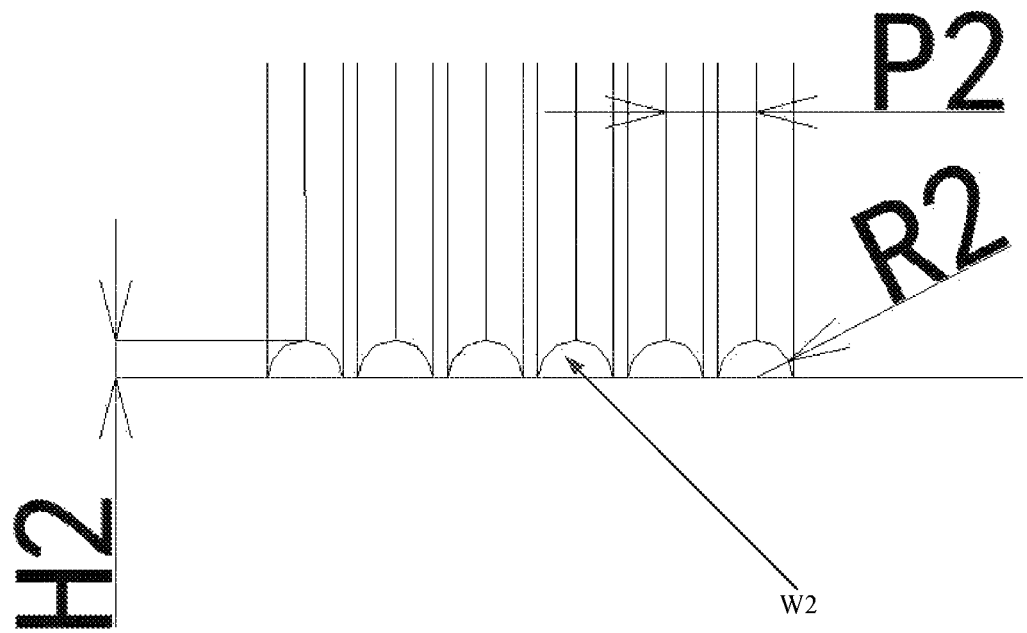
FIG. 6b is a view showing a size and arrangement of a second microstructure according to one embodiment of the present disclosure.

As shown in FIGS. 3 and 6b, in some embodiments, multiple second microstructures W2 are arranged on the wedge-shaped surface 6221, the multiple second microstructures W2 are arranged along a direction parallel to the light-entering surface 6213 of the wedge-shaped structure, at least one second microstructure W2 on the wedge-shaped surface 6221 extends in a direction perpendicular to the direction in which the second microstructures W2 are arranged.

A cross section of the second microstructure W2, in the direction along which the second microstructures W2 are arranged and in the direction perpendicular to the wedge-shaped surface 6221, is a second arc shape, a radius R2 of the second arc shape meets: 80 μm≤R2≤100 μm.

A distance P2 between centers of two adjacent second microstructures W2 meets: 34 μm P2≤44 μm.

A maximum height H2 of the second microstructure W2 in a direction perpendicular to the wedge-shaped surface 6221 meets: 1.8 μm≤H2≤2.2 μm.

Illustratively, the radius R2 of the second arc shape includes: 85 μm, 90 μm and 95 m, etc.

Illustratively, the distance P2 between the centers of two adjacent second microstructures W2 includes: 35 μm, 36 μm, 37 μm, 38 μm, 39 μm, 40 μm, 41 μm, 42 μm, 43 μm, etc.

Illustratively, the maximum height H2 of the second microstructure W2 in the direction perpendicular to the wedge-shaped surface 6221 includes: 1.9 mm, 2.0 μm and 2.1 μm, etc.

Illustratively, the second microstructure W2 protrudes above the wedge-shaped surface 6221.

Illustratively, the second microstructure W2 is formed as a one-piece structure with the light guide plate 62.

When the multiple second microstructures are arranged on the light-exiting surface 6211 in the above-mentioned layout manner, it is beneficial to multi-angle reflection and refraction of light, thereby to facilitate a uniformity in light distribution. As such, the backlight module 60 can achieve a multi-angle and high-efficiency light-exiting in the light-exiting region.

Figure 6C:
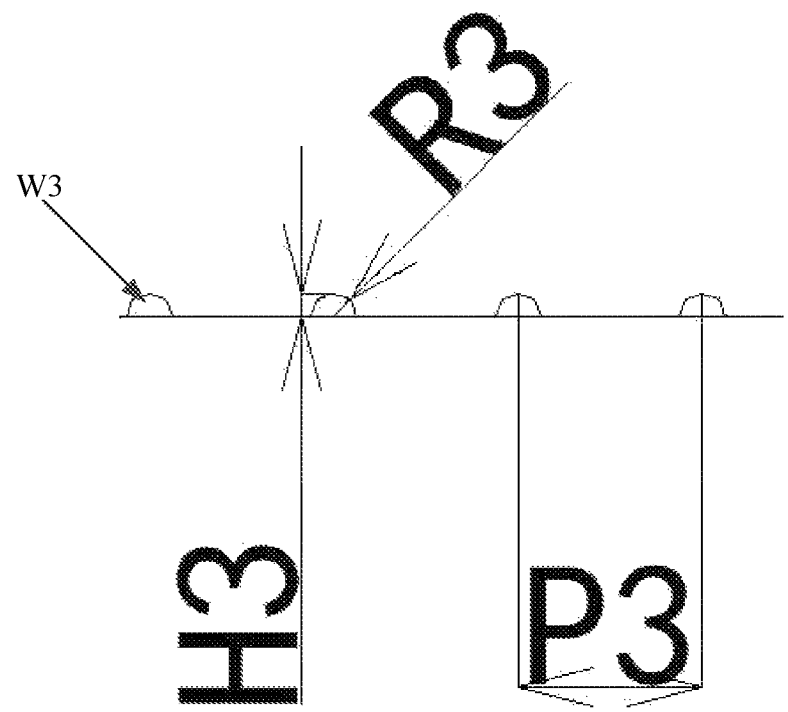
FIG. 6c is a schematic view showing a size and arrangement of a third microstructure according to one embodiment of the present disclosure.

As shown in FIGS. 3 and 6c, in some embodiments, the light-entering surface 6223 of the wedge-shaped structure and the body structure light-entering surface 6213 are coplanar, constituting a light-entering surface of the light guide plate 62. Multiple third microstructures W3 are arranged on the light-entering surface 6223 of the light guide plate 62, the multiple third microstructures W3 are arranged along a direction parallel to the light-exiting surface 6211 of the body structure, and the third microstructures W3 extend along a direction perpendicular to the direction in which the third microstructures W3 are arranged.

A cross section of the third microstructure W3, in a direction along which the third microstructures W3 are arranged and in a direction perpendicular to the light-entering surface 6223, is a third arc shape, and a radius R3 of the third arc shape meets: 90 μm≤R3≤110 μm.

A distance P3 between centers of two adjacent third microstructures W3 meets: 340 μm≤P3≤360 μm.

A maximum height H3 of the third microstructure W3 in the direction perpendicular to the light-entering surface 6223 meets: 29.5 μm≤H3≤30.5 μm.

Illustratively, the radius R3 of the third arc shape includes: 95 μm, 100 μm, 105 μm and 110 μm, etc.

Illustratively, the distance P3 between the centers of two adjacent third microstructures W3 includes: 345 μm, 350 μm and 355 μm, etc.

Illustratively, the maximum height H3 of the third microstructure W3 in the direction perpendicular to the light-entering surface 6223 includes: 29.7 mm, 29.8 μm, 29.9 μm, 30 μm, 30.2 μm, etc.

Illustratively, the third microstructure W3 protrudes above the light-entering surface 6223.

Illustratively, the third microstructure W3 is formed as a one-piece structure with the light guide plate 62.

When the multiple third microstructures are arranged on the light-entering surface 6223 in the above-mentioned layout manner, it is beneficial to multi-angle reflection and refraction of light, thereby to facilitate a uniformity in light distribution. As such, the backlight module 60 can achieve a multi-angle, high-efficiency light-entering on the light-entering surface, which is beneficial for improving the uniformity in the light emitted from the backlight module 60.

In some embodiments, P3>P2>P1.

With the above-mentioned arrangement, the light emitted by the light source can be better reflected and refracted at multiple angles on the light-entering surface, the wedge-shaped surface and the light-exiting surface, so as to improve the uniformity in the light-exiting of the backlight module 60.

Preferably, P3≥8P2, P2≥3P1 are provided.

Illustratively, the first microstructures W1, the second microstructures W2 and the third microstructures W3 are uniformly distributed on the surface on which they are located.

With the above-mentioned arrangement, the light emitted by the light source can be better reflected and refracted at multiple angles on the light-entering surface, the wedge-shaped surface and the light-exiting surface, so as to improve the uniformity in the light-exiting of the backlight module 60.

In some embodiments, in a direction parallel to the light-exiting surface of the body structure, a distance between the most distant third microstructures W3 is greater than the total length of the light source 611.

With the above-mentioned arrangement, it is able to enhance the refractive index of the light guide plate 62 in the corner region close to the light source, which is beneficial to improving the light brightness in the corner region and improving the dark shadow issue in the corner region.

Illustratively, the backlight module 60 includes four corner regions, two of which are located at a side close to the light source and two of which are located at a side to opposite to the light rays.

Figure 7:
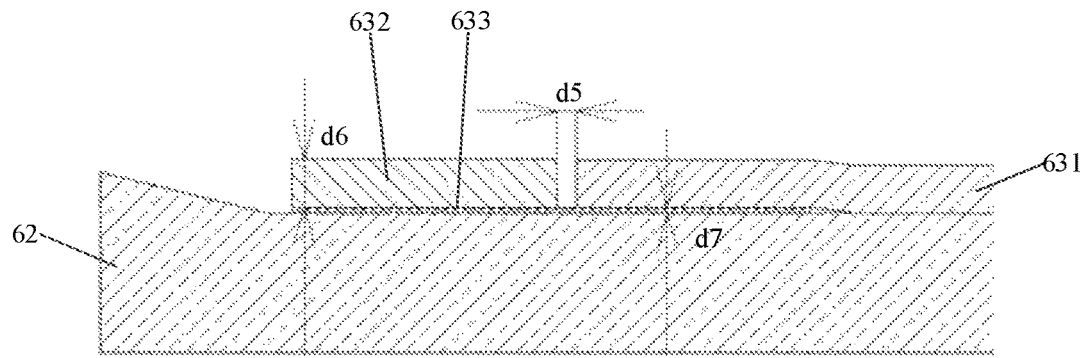
FIG. 7 is a schematic view showing a support black bar, an optical film, and a light-shielding film according to one embodiment of the present disclosure.

As shown in FIGS. 2, 3 and 7, in some embodiments, the backlight module 60 further includes an optical film 631, a supporting black bar 632 and a light-shielding film 633. The optical film 631 and the supporting black bar 632 are located on the light-exiting surface 6211 of the body structure 621, and at least part of the supporting black bar 632 is located between the wedge-shaped surface 6221 and the optical film 631. A first portion of the light-shielding film 633 is located between the supporting black bar 632 and the light-exiting surface 6211, and a second portion of the light-shielding film 633 is located between the optical film 631 and the light-exiting surface 6211.

A spacing d5 between the optical film 631 and the supporting black bar 632 meets: $0 \leq d5 \leq 0.1$ mm.

A thickness d6 of the supporting black bars 632 meets: $0.12$ mm $\leq d6 \leq 0.15$ mm.

A thickness d7 of the light-shielding film 633 meets: $0.013$ mm $\leq d7 \leq 0.017$ mm.

Illustrative, $0.03 \leq d5 \leq 0.07$ mm. When d5 is less than 0 (when there is no spacing), there is a risk of wrinkling of the optical film 631. When d5 is greater than 0.1 mm, the spacing between the optical film 631 and the supporting black bar 632 is too large, since some light will be transmitted due to the small thickness of the light-shielding film, the large spacing will cause the light emitted from the light guide plate 62 to pass through the light-shielding film and directly enter the end surface of the optical film 631, and then enter the display region along a groove of a prism of the optical film.

Illustratively, $0.12$ mm $\leq d6 \leq 0.135$ mm.

At the first contour edge, a light-shielding adhesive may or may not be provided. In the case where the first light-shielding adhesive 71 is provided at the first contour edge, when d6 is less than the thickness of the optical film 631, there is a level difference between an upper surface of the supporting black bar 632 and an upper surface of the optical film 631, so that a gap occurs between the supporting black bar 632 and the first light-shielding adhesive 71, and thereby light emitted from the light source enters the optical film from the side of the optical film through the gap. However, a prism layer in the optical film includes a plurality of prism protrusions, adjacent prism protrusions have a gap therebetween, and the light entering the optical film from the side surface will be transmitted in the gaps and finally exit the backlight module 60 and enter the display region of the display panel 40, resulting in a poor display. When d6 is greater than 0.15 mm, the level difference between the supporting black bar and the optical film 631 may be too large, and the supporting black bar may lift up the light-shielding adhesive, resulting in a decrease in the adhesion effect between the optical film and the light-shielding adhesive, which may in turn results in an easy separation of the light-shielding adhesive from the optical film after testing. As such, the lamp port effect cannot pass.

Preferably, the thickness of d6 is the same as the thickness of the optical film 631.

Illustratively, optical film 631 has a thickness between 0.108 mm and 0.128 mm. Alternatively, the optical film 631 has a thickness between 0.112 mm and 0.132 mm.

Note that the first light-shielding adhesive 71 is used for binding the display panel 40 and the backlight module 60.

Exemplary, $0.0145$ mm $\leq d7 \leq 0.0155$ mm. When d7 is too small, light of the light guide plate 62 easily passes through the light-shielding film and enter the optical film. When the thickness of d7 is too large, there is a hole between the optical film and the light guide plate 62 at the end of the light-shielding film close to the light-exiting region, so that the lamp port effect is adversely affected.

Illustratively, the spacing d5 between the optical film 631 and the supporting black bar 632 includes: 0.03 mm, 0.05 mm, 0.07 mm, 0.09 mm, etc.

Illustratively, the thickness d6 of the supporting black bar 632 includes: 0.13 mm, 0.14 mm, etc.

Illustratively, the thickness d7 of the light-shielding film 633 includes: 0.014 mm, 0.015 mm, 0.016 mm, etc.

Illustratively, the optical film 631 includes a three-layers-in-one film, i.e., an upper prism, a lower prism and a diffusion film, the lower prism is located between the upper prism and the diffusion film, the diffusion film is close to the light-exiting surface 6211, and the upper prism is away from the light-exiting surface 6211.

Illustratively, the supporting black bar 632 has a supporting and light-shielding function, and is used for supporting the first light-shielding adhesive 71. The provision of the supporting black bar can prevent the light guide plate 62 from directly adhering to the first light-shielding adhesive 71.

Note that, since the light-shielding film 633 has a small thickness, the light-shielding film 633 is formed an integral structure together with the supporting black bar 632 and the optical film 631. In a case where the supporting black bar 632 is not provided, the light-shielding film 633 cannot smoothly protrude out of the optical film 631 in height. Therefore, if the supporting black bar is not provided, the light-shielding film 633 is generally not provided at a position corresponding to the supporting black bar 632.

Note that a surface of the light-shielding film 633 facing the light guide plate 62 is not adhesive, and a surface of the light-shielding film 633 facing away from the light guide plate 62 is adhesive, so that the optical film will not be pulled through the light-shielding film 633 when the light guide plate 62 expands or contracts.

If the supporting black bar 632 is removed, the light-shielding film 633 is not arranged at the position corresponding to the supporting black bar 632, this may cause the light guide plate 62 to be directly adhered to the first light-shielding adhesive 71, and when the light guide plate 62 expands and contracts, the optical film may be pulled through the first light-shielding adhesive 71, so that the yield of the backlight module 60 is adversely affected.

Illustratively, the supporting black bar 632 is not in contact with the wedge-shaped surface 6221. Alternatively, the supporting black bar 632 is in contact with the wedge-shaped surface 6221. Preferably, the supporting black bar 632 is not in contact with the wedge-shaped surfaces 6221, so that floating of the supporting black bar 632 at the corner between the wedge-shaped surface and the light-exiting surface of the body structure is avoided.

Illustratively, the light-shielding film 633 includes a light-shielding resin such as light-shielding PET.

Illustratively, at least a portion of the light-shielding film 633 is located between the wedge-shaped surface 6221 and the light-exiting region of the backlight module 60. By way of example, the light-shielding film 633 is located on a side of the light guide plate 62 having the light-exiting region VA and close to the light source, and a distance between the light-shielding film 633 and the light-exiting region VA is about 0.1 mm. With this arrangement, it is able to avoid dark shadows on the side of the light-exiting region close to the light source. Illustratively, a boundary of the light-shielding film 633 may also coincide with the boundary of the light-exiting region VA.

With the above-mentioned arrangement, the light exiting from the non-light-exiting region of the backlight module 60 may be blocked by the supporting black bar 632 and the light-shielding film 633, and the light exiting from the non-light-exiting region may be prevented from directly entering an end surface of the optical film 631, thereby addressing the issue that light may be emitted from the lamp port.

Moreover, when d5 and d6 are set in the above-mentioned range, it is able to reduce the overall thickness of the backlight module 60 in a better manner. When d5 is in the above range, it is able to address the issue that light may be emitted from the lamp port in a better manner.

As shown in FIGS. 2 and 3, in some embodiments, the backlight module 60 further includes a reflective sheet 634.

The reflective sheet 634 is located on a side of the body structure 621 away from the light-exiting surface 6211.

A first portion of the carrier 612 is located on a side of the body structure 621 away from the light-exiting surface 6211, and a distance d8 between an orthographic projection of the first portion of the carrier 612 onto an extending plane of the body structure 621 and an orthographic projection of the reflective sheet 634 onto the extending plane of the body structure 621 meets: 0.1 mm≤d8≤0.3 mm.

Illustratively, the distance d8 between the orthographic projection of the first portion of the carrier 612 onto the extending plane of the body structure 621 and the orthographic projection of the reflective sheet 634 onto the extending plane of the body structure 621 includes: 0.15 mm, 0.2 mm, and 0.25 mm, etc.

Illustratively, the reflective sheet 634 is adhered to a housing 635 of the backlight module 60 by a reflective back adhesive 640. Illustratively, a boundary of the reflective sheet 634 facing the light source 611 is flush with a boundary of the reflective back adhesive 640 facing the light source 611.

When d8 is set in the above-mentioned range, the orthographic projection of the reflective sheet 634 onto the extending plane of the light-exiting surface 6211 can at least partially overlap with the orthographic projection of the light-shielding film 633 onto the extending plane of the light-exiting surface 6211. Preferably, the reflective sheet 634 can block the non-light-exiting surface 6212 to the largest extent, so as to improve the light-emitting efficiency of the backlight module 60 and improve the brightness of light emitted by the backlight module 60.

When d8 is set in the above range, it is able to addressing an issue of light interference due to a too close distance between the reflective sheet 634 and the carrier 612.

As shown in FIGS. 2 and 3, in some embodiments, the backlight module 60 further includes a housing 635 and a mold frame 636.

The light source structure, the light guide plate 62 and the reflective sheet 634 are all located inside the housing 635, and an opening of the housing 635 faces the light-exiting side of the backlight module 60. A thickness d9 of a bottom of the housing 635 meets: 0.065 mm≤d9≤0.075 mm.

At least part of the mold frame 636 and the light source structure are located on the same side of the light guide plate 62, the mold frame 636 is secured to the housing 635, a flatness of a middle part of the mold frame 636 is less than or equal to 0.15 mm, and a flatness of an edge part of the mold frame 636 is less than or equal to 0.4 mm. For example, the flatness of the middle portion of the mold frame 636 is less than or equal to 0.15 mm, and the flatness of the edge portion of the mold frame 636 is less than or equal to 0.35 mm. For example, the flatness of the middle portion of the mold frame 636 is less than 0.15 mm, and the flatness of the edge portion of the mold frame 636 is less than 0.35 mm.

Illustratively, the housing 635 includes an iron frame.

Illustratively, the carrier 612 is adhered to the bottom of the housing 635 by a light bar adhesive 639.

Illustratively, the thickness d9 of the housing 635 includes 0.067 mm, 0.069 mm, 0.070 mm, 0.072 mm, or 0.074 mm, etc.

Illustratively, the light source 611 is located between the light guide plate 62 and at least a portion of the mold frame 636.

As shown in FIG. 9, it should be noted that A represents the edge portion of the mold frame 636, and an upward warpage occurs on its edge, which is referred to as a bowl-type warpage, and is generally represented by a negative value. For example, −0.35 mm represents a maximum upward warpage of 0.35 mm. B represents an upward arch at a middle portion of a middle region of the mold frame 636, which is also called a turtle-type warpage, and is generally represented by a positive value. For example, +0.15 mm represents a maximum possible upward arch of 0.15 mm. The flatness refers to a degree of warpage or arch.

It should be noted that when measuring the flatness of the mold frame 636, the mold frame 636 may be placed on a marble having a flat surface and measured on a table. There is no clear boundary between the edge portion and the middle portion of the mold frame, a region where the bowl-type warpage can occur is an edge region, and a region where the turtle-type warpage can occur is the middle portion.

When the flatness of the housing 635 is measured, the housing 635 may be placed on a marble having a flat surface to be measured on a table, a region where the bowl-type warpage can occur is an edge region, and a region where the turtle-type warpage can occur is a middle portion.

For example, the flatness of the middle portion of the housing 635 is less than or equal to 0.15 mm, and the flatness of the edge portion of the housing 635 is less than or equal to 0.4 mm.

For example, the flatness of the middle portion of the housing 635 is less than or equal to 0.15 mm, and the flatness of the edge portion of the housing 635 is less than or equal to 0.35 mm.

For example, the flatness of the middle portion of the housing 635 is less than 0.15 mm, and the flatness of the edge portion of the housing 635 is less than 0.35 mm.

For example, in the case where the mold frame 636 is secured to the housing 635, the flatness of the middle portion of the housing 635 is less than or equal to 0.15 mm, and the flatness of the edge portion of the housing 635 is less than or equal to 0.4 mm. For example, the mold frame 636 is secured to the housing 635 through an adhesive-iron integrated injection molding process. For example, in the case where the mold frame 636 is secured to the housing 635, the flatness of the middle portion of the housing 635 is less than or equal to 0.15 mm, and the flatness of the edge portion of the housing 635 is less than or equal to 0.35 mm. For example, in the case where the mold frame 636 is secured to the housing 635, the flatness of the middle portion of the housing 635 is less than 0.15 mm, and the flatness of the edge portion of the housing 635 is less than 0.35 mm.

When measuring the flatness of the backlight module 60, the backlight module 60 may be arranged on a marble with a flat surface and measured on a table, a region where the bowl-type warpage can occur is an edge region, and a region where the turtle-type warpage can occur is a middle portion.

It should be appreciated that when measuring the flatness of the backlight module 60, the flatness of the assembled backlight module including the housing 635 and the mold frame 636 is measured.

Illustratively, the flatness of the middle portion of the backlight module 60 is less than or equal to 0.1 mm, and the flatness of the edge portion of the backlight module 60 is less than or equal to 0.3 mm. For example, the flatness of the middle portion of the backlight module 60 is less than 0.1 mm, and the flatness of the edge portion of the backlight module 60 is less than 0.3 mm. The definition of the flatness of the backlight module 60 is the same as the definition of the flatness of the mold frame, and the description thereof will not be repeated herein. It should be noted that the backlight module 60 has in an assembled form, and the flatness thereof may be better than the flatness of the mold frame 636, the flatness of the housing 635 and the flatness of an overall structure where the mold frame 636 and the housing 635 are secured. Optimizing the flatness of the backlight module 60 can be achieved by optimizing the flatness of the housing 635.

When d9 is set in the above-mentioned range, the flatness of the mold frame 636 is set in the above-mentioned range, and the flatness of the backlight module 60 is set in the above-mentioned range, not only the overall thickness of the backlight module 60 can be reduced, but also the influence of warpage of the housing 635 and the light guide plate 62 on the light efficiency of the module and the structural reliability in environmental testing can be avoided.

In the backlight module 60 of the above-mentioned embodiment, it is able to reduce the overall thickness X3 to be between 0.5 mm to 0.6 mm, thereby effectively reducing the thickness of the backlight module 60. Illustratively, the thickness of the backlight module 60 is reduced to 0.575 mm.

Note that, as shown in FIG. 2, the backlight module 60 may further include a strong/weak adhesive 637, an edge adhesive 638, and a graphite sheet 641.

The strong/weak adhesive 637 is located at one side of the backlight module 60 on which the light source is provided, and the two sides of the strong/weak adhesive 637 have different adhesive strengths, and the adhesive strength at the one side adhered to the display panel 40 is weak, so as to reduce the repair difficulty.

The edge adhesive 638 is located on the side of the backlight module 60 on which the light source is provided, and encloses part of the first light-shielding adhesive 71, part of the housing 635 and part of the graphite sheet 641, so as to improve the firmness of adhesion.

The graphite sheet 641 is located on the side of the backlight module 60 on which a light source is provided, and is located on the side of the housing 635 away from the light source.

In some embodiments, the thickness of the light source is set to be 0.4 mm in a direction perpendicular to the carrier. d1=0.26 mm. d2=0.29 mm. d3=0.4 mm. d4=1.57 mm. F=0.02 mm. 0.03 mm for the light-shielding adhesive. The thickness of the bottom of the housing is 0.07 mm. R2=90 μm, P2=39 μm, H2=2 μm. R1=90 μm, P1=150 μm, H1=2.4 μm. R3=100 μm, P3=350 μm, H3=3 μm.

On the basis of the above scheme, it is able to effectively reduce the overall thickness of the backlight module 60, ensure the light-entering rate of the light-entering surface of the light guide plate 62, and ensure that the wedge-shaped structure 622 has a well matching with the size of the light-exiting portion of the light source 611. The wedge-shaped structure 622 can be made to closely match the size of the light-exiting of the light source 611. In addition, the level difference between the wedge-shaped surface 6221 and the light-exiting surface 6211 is controlled to be within a reasonable range in the above-mentioned arrangement manner, so that the light emitted by the light source 611 will not be emitted to the light-exiting surface 6211 of the light guide plate 62 in large amount before entering the light-exiting region VA of the backlight module 60, thereby to ensure an optimal lamp port effect, and avoid the phenomenon of uneven brightness and darkness at the lamp port. Furthermore, the backlight module 60 is enabled to realize multi-angle and high-efficiency light-entering on a light-entering surface. The amount of light emitted from the wedge-shaped surface 6221 can be reduced, so that the backlight module 60 can realize a multi-angle, high-efficiency light emitting in the light-exiting region. Therefore, the backlight module 60 can realize a multi-angle, high-efficiency light exiting in the light-exiting region.

In some embodiments, a ratio of the thickness of the body structure 621 to the overall thickness of the light source 611 is less than or equal to 75%.

In the backlight module 60 of the above-mentioned embodiment, the light guide plate 62 includes the wedge-shaped structure 622 and the body structure 621, in the direction perpendicular to the bottom surface 6222, the ratio of the thickness of the body structure to the thickness of the light-exiting surface of the light source is less than 88%, and the ratio of the thickness of the body structure 621 to the overall thickness of the light source 611 is less than or equal to 75%, so that the light emitted by the light source can enter the wedge-shaped structure 622 to a greater extent, and is further transmitted from the wedge-shaped structure to the body structure. Therefore, the light-entering rate of the light-entering surface of the light guide plate 62 can be ensured, the light efficiency utilization rate can be improved, and the wedge-shaped structure 622 is well matched with the size of the light-exiting portion of the light source 611.

In some embodiments, on the light-exiting side of the light guide plate 62, the light-exiting surface of the light source protrudes with respect to the wedge-shaped structure 622; and/or the light-exiting surface of the light source protrudes with respect to the body structure 621 on a non-light-exiting side of the light guide plate 62 opposite to the light-exiting side.

On the basis of the above scheme, it is able to ensure the light-entering rate of the light-entering surface of the light guide plate 62, improve the light efficiency utilization rate, and ensure that the wedge-shaped structure 622 can be well matched with the size of the light-exiting portion of the light source 611.

As shown in FIG. 3, on the non-light-exiting surface 6212 of the body structure 621 away from the wedge-shaped structure 622, the body structure 621 includes a first region 690 and a second region, which are arranged adjacent to the light source 611 in an extending direction where the light sources 611 are arranged. An extension direction of a boundary line between the first region 690 and the second region is the same as the extending direction where the light sources 611 are arranged.

Figure 10:
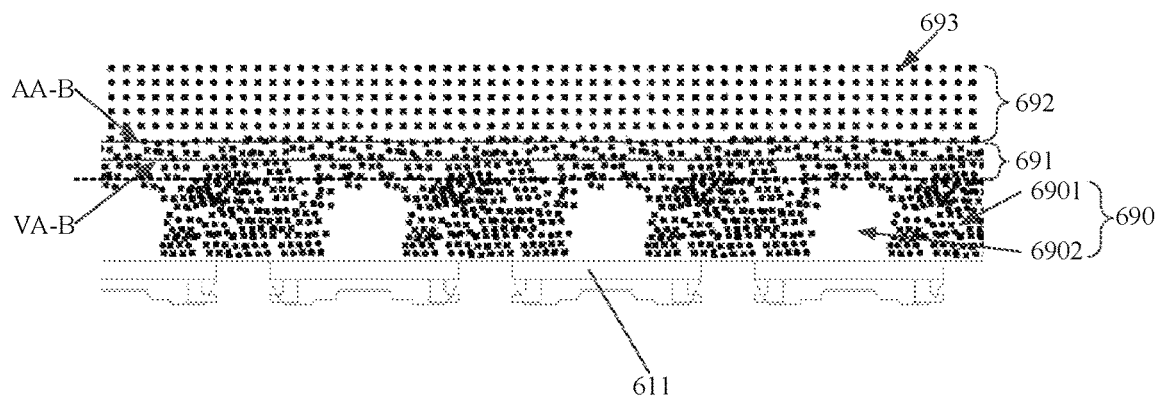
FIG. 10 is a schematic view showing the distribution of dots according to one embodiment of the present disclosure.

As shown in FIG. 10, the first region 690 includes a plurality of arch regions 6902 arranged along the direction where the light sources 611 are arranged, the arch regions 6902 correspond to the light sources 611 respectively, a bottom of the arch region is arranged to be adjacent to the light source 611, and an orthographic projection of two arched feet of the arch region 6902 onto an extending plane of the light-exiting surface of the light source 611 is located inside the light-exiting surface. In the first region 690, an average density of dots in the arch region 6902 is less than an average density of dots in the region 6902 outside the arch region.

Dots may or may not be provided in the arch region 6902 as desired. Preferably, no dots are provided in the arch region 6902.

In some embodiments, the second region further includes a first sub-region 691 and a second sub-region 692, the first sub-region 691 is located between the first region 690 and the second sub-region 692, an average density of dots in the first sub-region 691 is greater than an average density of dots in the second sub-region 692.

Specifically, the first region includes an intersection region, the arch region 6902 includes a bright region, the region 6902 outside the arch region includes a dark region, the first sub-region includes a light-mixing region, and the second sub-region includes a visible region.

Illustratively, the dot 693 includes a hemispherical structure having a diameter of between 0.036 mm and 0.040 mm. Whether the dots are evenly distributed can be set according to actual needs.

Note that the boundary AA-B of the visible region is also shown in FIG. 1. The boundary AA-B of the visible region refers to an orthographic projection of a boundary of the display region of the display panel 40 onto the extending plane of the backlight module 60.

Illustratively, the arch region 6902 is located between VA-B and the light source 611, and VA-B is located between AA-B and the arch region 6902.

With the above-mentioned arrangement, sparse dots can be arranged in the region directly opposite the light-exiting surface of the light source 611, and dense dots can be arranged in the region between adjacent light sources 611, so that weak light rays between the adjacent light sources 611 can be compensated, thereby addressing an issue that the brightness of light emitted along the direction of light source arrangement is not uniform. In addition, the dots are evenly distributed in the visible area, which is beneficial for improving the uniformity in the light emitted by the backlight module 60.

Various verifications have been done by the inventor.

Verification scheme 1: $d2=0.36$ mm, $d1=0.26$ mm, $F=0.1$ mm and the thickness of the light source in the direction perpendicular to the carrier is 0.4 mm. Results: there is a significant lamp eye at the lamp port due to the concentration of secondary light reflection.

Validation scheme 2: $d2=0.36$ mm, $d3=1$ mm. The thickness of the supporting black bar is 0.075 mm, the boundary of the light-shielding film close to the light-exiting region VA is flush with the boundary of the light-exiting region VA, and the others are conventional designs. Results: there is a serve lamp eye phenomenon with bright lines due to secondary reflected.

Verification scheme 3 $d2=0.36$ mm, $d3=1$ mm. The thickness of the support black bar is 0.075 mm, the light-mixing distance is 0.1 mm, the boundary of the light-shielding film close to the light-exiting region VA is flush with the boundary of the light-exiting region VA, and the others are conventional designs. Results: there is a serve lamp eye phenomenon, the lamp port is bright, and a region in front of the light source is dark.

Validation scheme 4: $d2=0.29$ mm, $d3=1$ mm. The thickness of the support black bar is 0.075 mm, the light-mixing distance is 0.1 mm, the boundary of the light-shielding film near the light-exiting region VA is flush with the boundary of the light-exiting region VA, and the others are conventional designs. Results: there is a slight lamp eye phenomenon, a slight bright bar before the lamp, and high brightness at two corner regions.

Validation scheme 5: $d2=0.38$ mm, $d3=1.4$ mm. The thickness of the support black bar is 0.075 mm, the light-mixing distance is 0.1 mm, the boundary of the light-shielding film near the light-exiting region VA is flush with the boundary of the light-exiting region VA, and the others are conventional designs. Results: the lamp eye phenomenon is obvious at the lamp port.

Validation scheme 6: $d2=0.34$ mm, $d3=0.4$ mm. The thickness of the support black bar is 0.075 mm, the light-mixing distance is 0.1 mm, the boundary of the light-shielding film near the light-exiting region VA is flush with the boundary of the light-exiting region VA, and the others are conventional designs. Results: the lamp eye phenomenon is obvious at the lamp port.

Verification scheme 7: $d2=0.36$ mm, $d3=0.4$ mm. The thickness of the support black bar is 0.075 mm, the light-mixing distance is 0.1 mm, the boundary of the light-shielding film near the light-exiting region VA is flush with the boundary of the light-exiting region VA, and the others are conventional designs. Results: brightness and darkness are uneven, there is a bright band and a lamp eye.

Verification scheme 8: $d2=0.29$ mm, $d3=0.4$ mm. The thickness of the supporting black bar is 0.075 mm, the others are of conventional design. Results: the vertical shadow is basically eliminated, there is no abnormal lamp eye at the lamp port, there is no uneven brightness and darkness, and there is no bright band, which has good lamp port effect.

In some embodiments, the body structure 621 and the wedge-shaped structure 622 are formed as one-piece structure.

The above-mentioned arrangement enables the body structure 621 and the wedge-shaped structure 622 to be integrally formed, which not only helps to reduce manufacturing costs and ensure manufacturing accuracy, but also improves the light guiding effect of the light guide plate 62.

In some embodiments, the light-entering surface 6223 of the wedge-shaped structure and the light-entering surface 6213 of the body structure are each a continuous surface. The continuous surface refers to that the light-entering surface 6223 of the wedge-shaped structure and the light-entering surface 6213 of the body structure are formed as an integral structure, and the light-entering surface 6223 of the wedge-shaped structure and the light-entering surface 6213 of the body structure have a smooth transition at the joint.

The above-mentioned arrangement can ensure the uniformity in the light-entering effect on the light-entering surface of the light guide plate 62, and avoid the excessive reflection.

In the backlight module 60 of the above-mentioned embodiment, the light guide plate 62 includes the wedge-shaped structure 622 and the body structure 621, it is able to effectively reduce t the overall thickness of the backlight module 60 in the direction perpendicular to the bottom surface 6222 through thinning the body structure 621.

In the backlight module 60 of the above-mentioned embodiment, the light guide plate 62 includes the wedge-shaped structure 622 and the body structure 621, in the direction perpendicular to the bottom surface 6222, the ratio of the thickness of the body structure 621 to the thickness of the light source 611 is less than 75%, at the light-exiting side of the light guide plate 62, the light source 611 protrudes with respect to the wedge-shaped structure 622, and at the side of the light guide plate 62 opposite to the light-exiting side, the light source 611 protrudes with respect to the body structure 621. The orthographic projection of the two opposite boundaries of the light-entering surface 6223 of the wedge-shaped structure in the direction perpendicular to the light-exiting surface of the body structure onto the extending plane of the light-exiting surface of the light source 611 is located between the two opposite boundaries of the light-exiting surface of the light source 611 in the direction perpendicular to the light-exiting surface of the body structure, so that the light emitted by the light source can enter the wedge-shaped structure 622 to a greater extent and is further transmitted from the wedge-shaped structure to the body structure, thereby ensuring the light-entering rate of the light-entering surface of the light guide plate 62, improving the light efficiency utilization rate and ensuring that the wedge-shaped structure 622 can well match the size of the light-exiting port of the light source 611.

In some embodiments, as shown in FIG. 1, the display module further includes a light-shielding layer 70 located between the display panel 40 and the backlight module 60. The light-shielding layer at least partially surrounds the light-exiting region VA of the backlight module 60. The light-shielding layer is used for shielding light so as to avoid cross-talk occurring for the display from unnecessary backlight light. For example, the light-shielding layer 70 may also be a light-shielding adhesive, e.g., the light-shielding adhesive may be a three-layer material adhesive/black PET/adhesive laminated one on another, and used for enabling the display panel 40 to be adhered to the backlight module 60, so as to improve the secure effect between the display panel 40 and the backlight module 60.

Figure 11A:
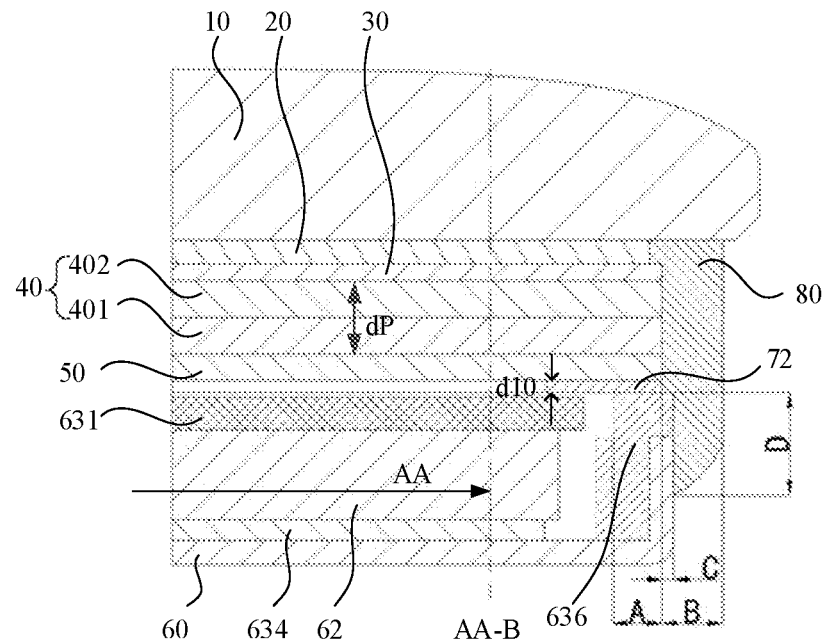
FIG. 11A is another view showing the display module according to one embodiment of the present disclosure.
Figure 11B:
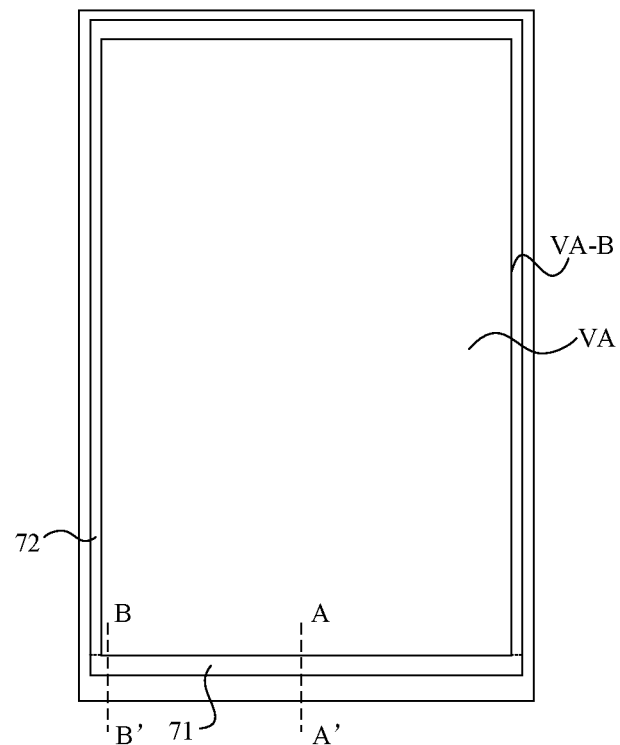
FIG. 11B is yet another view showing the display module according to one embodiment of the present disclosure.

As shown in FIGS. 11A and 11B, in some embodiments, the light-shielding layer 70 may include a first light-shielding layer 71 and a second light-shielding layer 72, the first light-shielding layer 71 refers to a light-shielding layer disposed at the first contour edge and the second light-shielding layer 72 refers to a light-shielding layer disposed at the second contour edge. For example, the first light-shielding layer 71 and the second light-shielding layer 72 may be formed as a one-piece structure, e.g., through cutting. In other embodiments, only the second light-shielding adhesive 72 may be provided. The second light-shielding adhesive 72 partially surrounds the light-exiting region VA of the backlight module 60.

As shown in FIG. 11A, in some embodiments, a thickness d10 of the second light-shielding layer 72 meets: 0.027 mm≤d10≤0.033 mm. For example, the thickness d10 of the second light-shielding layer 72 meets: 0.028 mm≤d10≤0.032 mm. Illustratively, the thickness d10 of the second light-shielding layer 72 includes 0.029 mm, 0.030 mm, 0.031 mm, and the like. Through controlling the thickness of the second light-shielding layer 72, the overall thickness of the display module may be reduced. In some embodiments, a thickness of the first light-shielding layer 71 may be the same with the thickness of the second light-shielding layer 72.

In some embodiments, as shown in FIG. 11A, the second light-shielding layer 72 is in contact with the backlight module 60. Specifically, the second light-shielding layer 72 is in contact with a plastic frame 636 of the backlight module 60 at a width (denoted by A in the figure) of at least 0.15 mm, so as to improve the shielding effect on the backlight and reduce the possibility of light leakage. In addition, it is also ensured that when the side adhesive 80 is subsequently applied, the side adhesive 80 also is not infiltrated into the backlight module 60.

In some embodiments, as shown in FIG. 11A, at the at least one second contour edge, a width (denoted by B in the figure) of the side adhesive 80 covering an end portion of the display panel 40 is in the range of 0.15 mm to 0.25 mm. Illustratively, different values of 0.15 mm, 0.2 mm, 0.25 mm, etc. may be included. For example, at the at least one second contour edge, the width (denoted by B in the figure) of the side adhesive 80 covering the end portion of the display panel 40 is in the range of 0.15 mm to 0.20 mm. By controlling the width of the side adhesive 80 covering the end portion of the display panel 40, it is able to ensure that the display panel 40 is effectively adhered to the backlight module 60 through the side adhesive 80, and prevent the side adhesive 80 from being cut off by the light-shielding adhesive due to the positional deviation of the light-shielding layer 70, thereby to ensure the secure effect between the side adhesive 80 and the display panel 40 as well as the backlight module 60.

In some embodiments, an edge of the second light-shielding layer 72 close to the second contour edge protrudes with respect to the backlight module 60, and in order to ensure the secure strength of the side adhesive 80, a minimum distance between the edge of the second light-shielding layer 72 close to the second contour edge and an outer contour of the side adhesive 80 is less than or equal to 0.05 mm, that is, a thickness of the side adhesive 80 is designed in such a manner that the side adhesive 80 has a thickness of at least 0.05 mm outside the edge of the second light-shielding layer 72 close to the second contour edge.

In some embodiments, a side edge of the display panel 40 at a side where the second contour edge is located is indented inwardly relative to an outer contour of the backlight module 60. Specifically, a length of the backlight module 60 protruding with respect to the display panel 40 (namely, corresponding to C in FIG. 11A) may be set to be less than or equal to 0.15 mm, so as to provide effective protection for the display panel 40 by the backlight module 60. Preferably, the value of C ranges from 0.05 mm to 0.1 mm. Illustratively, the C value can be 0.03 mm, 0.05 mm, 0.1 mm. For example, on the side where the second contour edge is located, an edge of the first polarizer 30 or an edge of the second polarizer 50 is aligned with an edge of the display panel 40. For example, on the side where the second contour edge is located, the edge of the first polarizer 30 and the edge of the second polarizer 50 are aligned with the edge of the display panel 40.

In some embodiments, as shown in FIG. 11A, an orthographic projection of an edge of the backlight module 60 corresponding to the side where the second contour edge is located onto the extending plane of the transparent cover plate 10 is closer to the second contour edge of the display module than an orthographic projection of an edge of the second light-shielding layer 72 adjacent to the side where the second contour edge is located onto the extending plane of the transparent cover plate 40, namely, at the second contour edge, the second light-shielding layer 72 is indented inwardly relative to the backlight module 60. Preferably, the second light-shielding layer 72 is indented inwardly relative to the backlight module 60 by 0.05 mm or less, so that the consolidation effect of the side adhesive 60 can be enhanced.

In other embodiments, a distance from the edge of the backlight module 60 corresponding to the side where the second contour edge is located to the second contour edge is the same as a distance from the second light-shielding layer 72 to the second contour edge, that is, the edge of the backlight module 60 is flush with the edge of the second light-shielding adhesive 72.

Preferably, as shown in FIG. 11A, the edge of the second light-shielding layer 72 close to the second contour edge is flush with the second contour edge of the display panel 40, and the second light-shielding layer 72 is indented inwardly relative to the backlight module 60, so as to enhance the consolidation effect of the side adhesive 60. Preferably, the second light-shielding layer 72 is indented inwardly relative to the backlight module 60 by less than or equal to 0.05 mm.

It should be appreciated that the edge of the second light-shielding layer 72 may also exceed the backlight module 60 due to assembly errors, dimensional tolerances of the structures themselves, etc. In the embodiment, a size of the second light-shielding layer 72 exceeding the backlight module 60 is controlled not to be greater than 0.12 mm, so as to ensure that the second light-shielding adhesive 72 does not cut off the side adhesive 80.

In the display module of the embodiments of the present disclosure, the side adhesive 80 and/or the second light-shielding adhesive 72 are arranged so as to reduce the possibility of light leakage between the backlight module 60 and the display panel 40. Further, the thickness of the second light-shielding adhesive 72 is set in the above range, the overall thickness of the display module is well reduced.

In some embodiments, as shown in FIG. 11A, a length of a region where the side adhesive 80 overlaps the backlight module 60 in the direction perpendicular to the transparent cover plate 10 is not less than half of the thickness of the backlight module 60. Namely, as shown in FIG. 11A, the value of D is greater than or equal to one half of the thickness of the backlight module 60. Since the side adhesive 80 applied to the backlight module 60 is relatively thin with respect to the side adhesive 80 applied to the side edge of the display panel 40, it is able to improve the consolidation effect of the side adhesive 80 on the backlight module 60 and the display panel 40 by making the D value greater than or equal to one half of the thickness of the backlight module 60. Preferably, the D value is less than four-fifths of the thickness of the backlight module 60.

In a specific embodiment, as shown in FIG. 11A, the side adhesive 80 extends continuously from the transparent cover plate 10 in a direction perpendicular to the transparent cover plate 10 and is disposed in contact with the side edge of the display panel 40 and the side surface of the backlight module 60. Preferably, both the side adhesive 80 is in contact with a side of the mold frame 636 facing the transparent cover plate 10 and a surface of the mold frame 636 away from the light guide plate 62 and not covered by the housing 635, so that the secure and light-shielding effect of the side adhesive 80 is further enhanced.

Illustratively, in the case where the thickness of the backlight module 60 is 0.7 mm, a size of a portion where the side adhesive 80 is adhered to the backlight module 60 along a thickness direction of the backlight module 60 is not less than 0.35 mm.

Figure 12A:
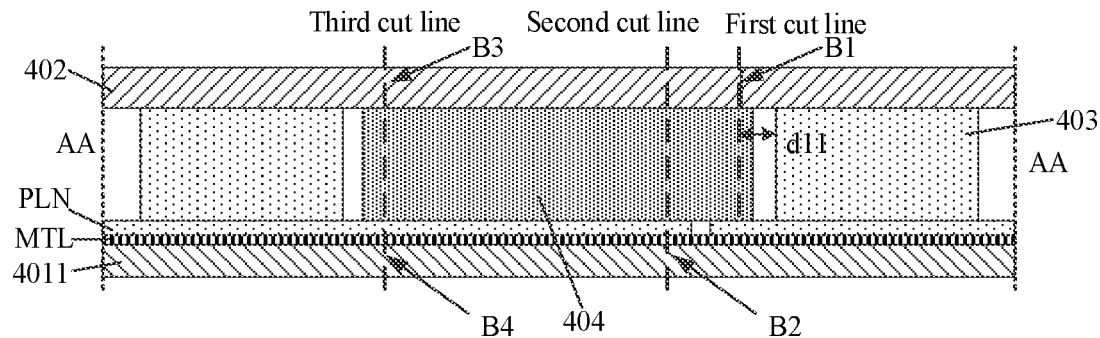
FIG. 12A is a schematic view showing a cut position of a display panel according to one embodiment of the present disclosure.
Figure 12B:
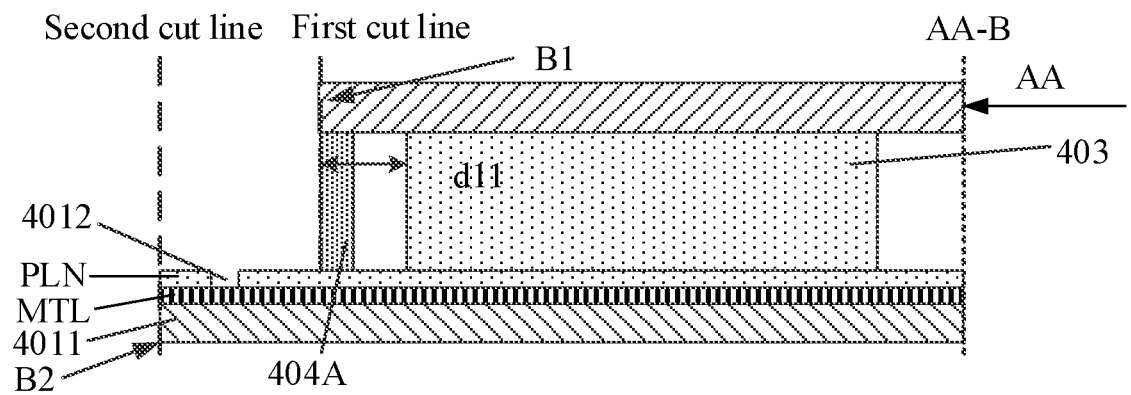
FIG. 12B is a schematic view showing a cut display panel according to one embodiment of the present disclosure.

In some embodiments, referring to FIGS. 12A and 12B, the display panel 40 further includes a sealant 403 located between the first substrate 401 and the second substrate 402. Specifically, the liquid crystal between the first substrate 401 and the second substrate 402 may be sealed by the sealant 403, which is located in the non-display region of the display panel 40.

For example, the display module may be divided into the display region AA and the non-display region, and the transparent cover plate 10 may be divided into a light-exiting region of the transparent cover plate and a light-shielding region of the transparent cover plate, the light-shielding region of the transparent cover plate surrounds the light-exiting region of the transparent cover plate. Preferably, an orthographic projection of the display region AA onto the extending plane of the transparent cover plate 10 is located within the light-exiting region of the transparent cover plate, i.e., a size of the transparent cover plate light-exiting region is slightly larger than the display region AA of the display module, so as to meet assembly tolerances. The light-shielding region of the transparent cover plate may be formed by applying a non-transparent ink onto the transparent cover plate 10.

In some embodiments, the display module is a fully-seamless-adhesion display module. In particular, an orthographic projection of the optical adhesive layer 20 onto the extending plane of the transparent cover plate 10 covers the orthographic projection of the display region AA of the display panel 40 onto the extending plane of the transparent cover plate 10.

In some embodiments, the side adhesive 80 is in contact with a side surface of the optical adhesive layer 20. For example, the side adhesive 80 is adhered to a contour formed by the transparent cover plate 10, the optical adhesive layer 20, the display panel 40, the second light-shielding layer 72 and the backlight module 60, so as to further enhance the overall strength of the display module. For example, the side adhesive 80 is non-transparent, so as to avoid side light leakage.

In the display module of the embodiments of the present disclosure, an overall thickness of the display panel 40 and the backlight module 60 can be compressed to be less than or equal to 1 mm, for example, about 0.9 mm. Illustratively, the overall thickness of the display panel 40 and the backlight module 60 is 0.902 mm.

As shown in FIG. 11A, in some embodiments, a thickness dP of the display panel 40 meets: 0.1975 mm≤dP≤0.2025 mm. Illustratively, the thickness dP of the display panel 40 may be one of 0.1980 mm, 0.1985 mm, 0.1990 mm, 0.1995 mm, 0.2 mm, 0.2020 mm. When the thickness dP of the display panel 40 is set in the above range, the overall thickness of the display module can be well reduced.

In some embodiments, in order to reduce the thickness of the display panel 40, a substrate of the first substrate 401 and/or the second substrate 402 may be thinned after the first substrate 401 and/or the second substrate 402 has been finished, thereby reducing the overall thickness of the display panel 40.

The inventors have found that, after a thinning process is performed on the substrate of the first substrate 401 and/or the second substrate 402 has been thinned, when a mother substrate obtained after the formation of a cell is cut to obtain the display panel 40, a possibility that to the display panel 40 obtained by cutting is damaged is increased due to the thinning of the substrate, resulting in a decrease in yield.

In some embodiments, the thinning process specifically includes reducing the overall thickness of the display panel from 0.25 mm to 0.2 mm, which may be realized by thinning each of the substrate of the first substrate 401 and the substrate of the second substrate 402 by 0.025 mm. It has been found through test that if the thinned mother substrate is cut according to a cutting method in the related art, the yield of the obtained display panel is almost 0, that is, a qualified display panel can hardly be obtained.

In some embodiments, as shown in FIGS. 12A and 12B, the mother substrate may be cut to obtain a plurality of display panels 40.

In some embodiments, a support structure 404 may be provided on the mother substrate, so as to increase the yield of the display panels 40. The support structure 404 is located on a side of the sealant 403 of the display panel 40 away from the display region AA (AA-B is the boundary of the display region AA) of the display panel 40, and the support structure 404 is located between the first substrate 401 and the second substrate 402. For example, the support structure 404 is in contact with both the first substrate 401 and the second substrate 402. Referring to FIG. 12B, a remaining portion of the support structure 404 on the cut display panel is a support structure 404A.

As shown in FIG. 12B, the second substrate 402 of the display panel 40 includes a first edge B1, and a third edge B3 arranged opposite to the first edge B1 (on adjacent display panels respectively before cutting in FIG. 12A), and the first substrate 401 includes a second edge B2, and a fourth edge B4 opposite to the second edge B2 (on the adjacent display panels respectively before cutting in FIG. 12A). The first edge B1 and the second edge B2 are located on the first side edge of the display panel 40. The third edge B3 and the fourth edge B4 are located on the second side edge opposite to the first side edge. The first edge B1 is closer to the display region AA of the display panel 40 than the second edge B2.

For example, an orthographic projection of the third edge B3 onto an extending plane of the substrate of the first base plate 401 coincides with the fourth edge B4. For example, the third edge B3 and the fourth edge B4 may be formed through a same cutting process.

Illustratively, a boundary of the support structure 404A away from the display region AA is flush with the first edge B1. A distance d11 between the first edge B1 and the sealant 403 is in the range of 0.05 mm to 0.12 mm, so that the support structure 404 may provide effective support and shock absorption during cutting the mother substrate, thereby improving the cutting yield of the thinned display panel, especially when the overall thickness of the display panel is less than 0.25 mm. Specifically, d11 may be one of 0.05 mm, 0.07 mm, 0.095 mm, 0.100 mm, 0.105 mm, 0.12 mm. In a specific embodiment, the overall thickness of the display panel 40 is 0.2 mm and d11 is 0.1 mm, the yield reaches a target level.

Note that the distance d11 between the first edge B1 and the sealant 403 may be understood as a distance in a direction perpendicular to a first cut line on an extending plane of the display panel 40.

Illustratively, the second substrate 402 includes a first transparent substrate, and a black matrix layer BM, a color filter layer, and a color filter planarization layer on the first transparent substrate. The black matrix layer BM, the color filter layer and the color filter planarization layer may be arranged sequentially on the first transparent substrate. The color filter layer may include a red color filter, a green color filter, and a blue color filter, so as to achieve a color display of the display module. For example, the black matrix layer BM, the color filter layer, and the color filter planarization layer are located on a side of the first transparent substrate close to the first substrate 401. For example, the black matrix layer BM and the color filter layer are located between the first transparent substrate and the color filter planarization layer. For example, the support structure 404 is disposed in contact with the color filter planarization layer. For example, the support structure 404 is fixedly secured to the second substrate 402. For example, there is no adhesion of the support structure 404 to the first substrate 401. For example, the support structure 404 is prepared on the second substrate 402.

Illustratively, referring to FIG. 12B, the support structure 404 is disposed in contact with the first substrate 401.

Illustratively, a gap may also exist between the support structure and the first substrate 401. The gap is sized to provide support when cutting the mother substrate.

Illustratively, the first substrate 401 includes a second transparent substrate 4011 and a planarization layer PLN, the planarization layer PLN is located on a side of the second transparent substrate 4011 close to the second substrate 402. For example, the support structure 404 is disposed in contact with the planarization layer PLN.

Illustratively, the support structure 404 may be arranged at a same layer as a pillar support PS, and the pillar support PS may be located within the display region AA, for supporting the second substrate 402. For example, the support structure 404 may be made of a same material as the pillar support PS, e.g., the support structure 404 and the pillar support PS are formed through a same process.

Illustratively, the first substrate 401 further includes a metal layer MTL, the MTL is located between the second transparent substrate 4011 and the planarization layer PLN. For example, the metal layer MTL may include one or more layers of metal. For example, a gate line and/or a data line of the display panel 40 are located in the metal layer MTL. For example, the metal layer MTL includes a pad electrode located in a non-display region. Referring to FIG. 12B, the planarization layer PLN includes an opening 4012 in the non-display region corresponding to the first side edge of the display panel 40, and a driver chip IC is electrically connected to the pad electrode through the opening 4012, so as to provide a driving signal for the display panel 40.

Illustratively, the orthographic projection of the second substrate 402 onto the first substrate 401 does not completely cover the opening 4012. Illustratively, referring to FIG. 12B, the orthographic projection of the second substrate 402 onto the first substrate 401 does not overlap the opening 4012, thus facilitating electrical connection of the driver chip IC to the pad electrode through the opening 4012.

Referring to FIGS. 12A and 12B, in at least a portion of the non-display region corresponding to the first side edge of the display panel 40, at a side of the opening 4012 away from the display region AA, the planarization layer PLN is still included, such that when cutting along a second cut line, the support structure 404 disposed in contact with the planarization layer PLN at the second cut line, so as to provide effective support for the second substrate 402 and the first substrate 401, thereby mitigate the crack generation caused by the cutting vibration.

In some exemplary embodiments, after the mother substrate has been cut, the support structure 404 does not need to be specifically processed, i.e., a state of the support structure 404A after cutting is maintained. In other embodiments, a process step for cleaning the remaining support structure 404A may be added.

Note that the support structure 404A does not affect the performance of the display panel 40, so that the cut support structure 404 can be maintained, as shown in FIG. 12B, and the support structure residue 404A can be observed on the cut display panel 40 without adding the process step of cleaning the remaining support structure 404A. It should be noted that in this embodiment, a position of the support structure residue 404A is only shown by way of example and does not represent an actual shape of the support structure residue 404A.

In the display module of the above-mentioned embodiment, when cutting the support structure 404 at the first cutting line, it is able to effectively improve the cutting yield.

It should be noted that in a process of forming the display panel 40, the mother substrate including multiple display panels 40 is typically formed first, and then cutting the mother substrate is cut to form multiple individual display panels 40.

For each display panel 40, two cutting processes are required at the DP side, the two cutting processes corresponding to the first cut line and the second cut line in FIG. 12A, respectively. A first cut line corresponds to the first edge B1 of the second substrate 402 at the DP side and the second cut corresponds to the second edge B2 of the first substrate 401. Referring to a position of a third cut line in FIG. 12A (illustrated by an adjacent display panel 40), a third cutting process is performed at a DPO side, and one cutting operation of the third cutting process corresponds to the fourth edge B4 of the first substrate 401 and the third edge B3 of the second substrate 402 on the DPO side.

For example, referring to FIG. 12A, at the DPO side of the display panel 40, a remaining portion of the support structure 404 after cutting is also included, so that when cutting along the third cut line, the support structure 404 provides support during the third cutting process, thereby to improve cutting yield.

For example, the support structure 404 may be continuously disposed on the mother substrate from the first cut line to the second cut line. For example, the support structure 404 may be continuously arranged on the mother substrate from the first cut line to the third cut line. When the support structure 404 is provided continuously, it means that the support structure 404 is integrally formed in a block shape, thereby providing a good support effect.

It should be appreciated that the cutting process also includes cuttings for forming two boundaries in a lateral direction between the DP side and the DPO side, such that the display panel 40 is cut away from the mother substrate. For example, in the case of cutting for forming two borders in the lateral direction between the DP side and the DPO side, the support structure 404 is also provided at cutting positions corresponding to cuttings for forming two boundaries in a lateral direction between the DP side and the DPO side, so as to provide the good support effect. For example, the remaining support structure is retained after cutting at two boundaries between the DP side and the DPO side in the lateral direction.

For example, the remaining portion of the support structure 404 after cutting surrounds the display region AA. For example, the remaining portion of the support structure 404 after cutting is in a closed surrounding structure.

For example, the remaining portion of the support structure after cutting surrounds the sealant 403. For example, the sealant 403 surrounds the display region AA and forms a closed surrounding structure. The remaining portion of the support structure 404 after cutting is in a closed loop structure and surrounds the sealant 403.

For example, an outer boundary of the remaining portion of the support structure after cutting includes at least a portion disposed in alignment with the boundary of the side display panel 40 at each side of the display panel 40. Hence, the support structure can form a support for a periphery of the mother substrate during cutting, so as to facilitate improving cutting yield.

For example, referring to FIGS. 12A and 12B, a distance between the first cut line and a boundary of the support structure 404 (the support structure 404A after being cut) close to the sealant 403 on the extending plane of the display panel 40 in a direction perpendicular to the first cut line is greater than or equal to 0.05 mm. For example, a distance between the first cut line and the boundary of the support structure 404 away from the sealant 403 on an extending plane of the mother substrate in the direction perpendicular to the first cut line is not less than 0.05 mm. In the case where the support structure 404 is provided on both sides of the first cutting line, the support effect is better. Preferably, distances from boundaries of the support structure 404 on both sides of the first cut line to the first cut line on the mother substrate are greater than or equal to 0.05 mm. The distances from the boundaries of the support structure 404 on both sides of the first cut line to the first cut line may be understood as distances of the boundaries on the extending plane of the mother substrate in the direction perpendicular to the first cut line.

For example, as a result of the above-described embodiment, in the display panel 40, the distance between the second edge B2 and the boundary of the support structure 404A close to the sealant 403 on the extending plane of the display panel 40 in the direction perpendicular to the second edge B2 is greater than or equal to 0.05 mm.

Figure 13A:
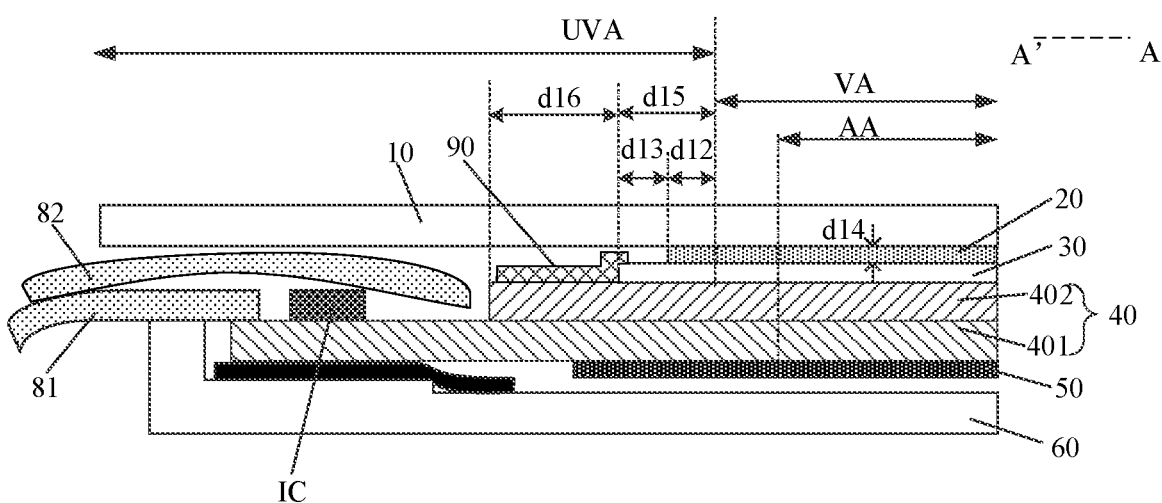
FIG. 13A is a sectional view of the display module in FIG. 11B along line A-A' in some embodiments of the present disclosure.
Figure 13B:
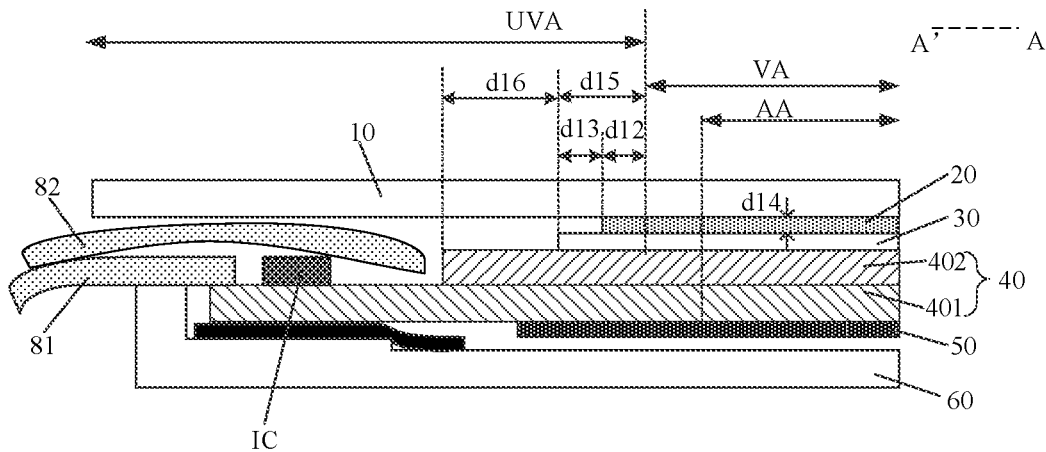
FIG. 13B is another sectional view of the display module in FIG. 11B along line A-A' according to some embodiments of the present disclosure.
Figure 13C:
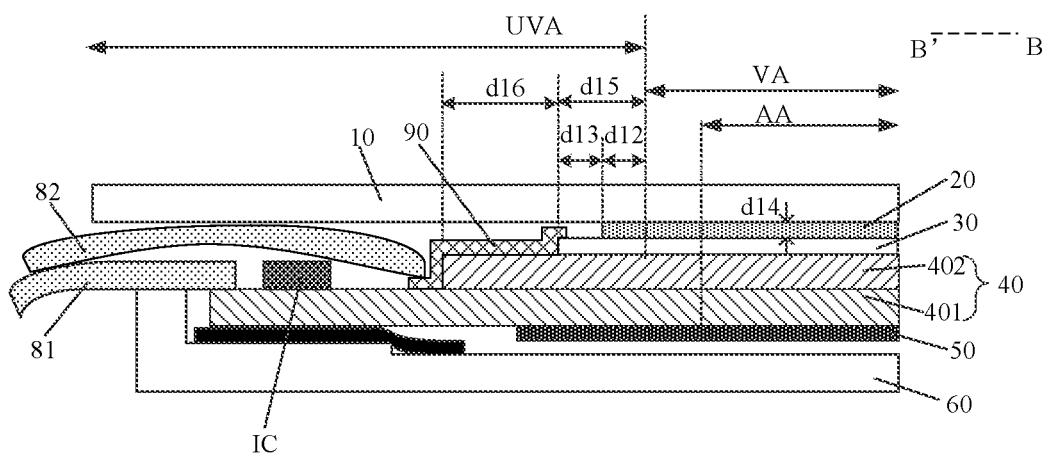
FIG. 13C is a sectional view of the display module in FIG. 11B along line B-B' according to some embodiments of the present disclosure.

FIG. 13A is a sectional view of the display module in FIG. 11B along line A-A' in some embodiments of the present disclosure. FIG. 13B is a sectional view of the display module in FIG. 11B along line A-A' in other embodiments of the present disclosure. FIG. 13C is a sectional view of the display module in FIG. 11B along line B-B' in some embodiments of the present disclosure. FIGS. 13A and 13C may be used to illustrate a same embodiment. FIGS. 13B and 13C may be used to illustrate a same embodiment.

Referring to FIGS. 13A-13C, the display module specifically includes the transparent cover plate 10, the optical adhesive layer 20, the first polarizer 30, the display panel 40, the second polarizer 50 and the backlight module 60 laminated one on another sequentially. The display panel 40 includes the first substrate 401 and the second substrate 402, the first substrate 401 is arranged protruding with respect to the second substrate 402 at the first contour edge, and the array substrate 401 is in a binding connection with the flexible circuit board 81 at the first contour edge. For example, the flexible circuit board 81 is bound to the array substrate 401 by an anisotropic conductive paste (ACF paste).

Illustratively, referring to FIGS. 13A-13C, optical adhesive layer 20 has a thickness d14 of less than or equal to 0.15 mm, so as to achieve the effect of reducing the overall thickness of the display module. For example, 0.05 mm≤d14≤0.1 mm. For example, 0.072 mm≤d14≤0.078 mm. Illustratively, the thickness d14 of the optical adhesive layer 20 may be one of 0.073 mm, 0.074 mm, 0.075 mm, 0.076 mm, 0.077 mm. In the display module of the above-mentioned embodiment, the thickness of the optical paste is set in the above-mentioned range, so that the overall thickness of the display module can be reduced while ensuring the display effect. For example, optical adhesive layer 20 has a refractive index in the range of 1.4 to 1.6. For example, optical adhesive layer 20 has a refractive index in the range of 1.44 to 1.52. For example, the optical adhesive layer has a refractive index of 1.48.

During the use of the display module, static charges may be generated due to external environment and other factors, and the static charges may affect the display effect of the display panel. In order to prevent the display module from being adversely affected by the static charges, an anti-static device needs to be provided, so as to conduct static charges out.

In one embodiment, referring to FIGS. 13A-13C, static charges are conducted out by providing a conductive paste layer 90. The conductive paste may specifically be a silver paste. The conductive paste layer 90 is arranged on the first side edge, and the conductive paste layer 90 is electrically connected to an end surface of the first polarizer 30 located on the first side edge and the first substrate 401. For example, a thickness of the conductive paste layer 90 at a position where the conductive paste layer is in contact with the end surface of the first polarizer at the first side edge is greater than a thickness of the first polarizer 30. For example, an orthographic projection of the conductive paste layer 90 onto the first substrate 401 overlaps the orthographic projection of the first polarizer 30 onto the first substrate 401. As such, the conductive paste layer 90 can be sufficiently contacted with the first polarizer 30, so as to improve the electrostatic charges export effect.

For example, the first polarizer 30 is in direct contact with the optical adhesive layer 20.

For example, referring to FIG. 13A and FIG. 12C, the conductive paste layer 90 includes a portion in an extending space of the optical adhesive layer 20 at the position where the conductive paste layer is in contact with the end surface of the first polarizer 30 at the first side edge, that is, the conductive paste layer 90 may form a barrier to the flow of the optical adhesive layer 20 in the cover plate 10 and the first polarizer 30.

If static charges are generated during the operation of the display module, the static charges may be conducted from the transparent cover plate 10 to the first polarizer 30 and further transferred to the first substrate 401 via the conductive paste layer 90. For example, the first substrate 401 may include a ground terminal, and the conductive paste layer 90 may be electrically connected to the ground terminal, so as to conduct static charges out through the ground terminal. For example, the ground terminal is electrically connected to the flexible circuit board 81, and static charges are conducted out through the flexible circuit board 81, so as to complete the discharge of static charges, thereby reducing a possibility of the display panel 40 having a black-screen display abnormality due to static charges. For example, the display module includes a conductive member 82 electrically connected to the conductive paste layer 90 and the flexible circuit board 81, and the static charges may be conducted to the flexible circuit board 81 via the conductive layer 82 and discharged via the flexible circuit board 81. For example, the conductive member 82 is located on the first substrate 401 and the flexible circuit board 81, the flexible circuit board 81 includes an exposed copper region, and the conductive member 82 is in contact with and electrically connected to the exposed copper region. For example, the conductive member 82 includes a copper foil.

Figure 14:
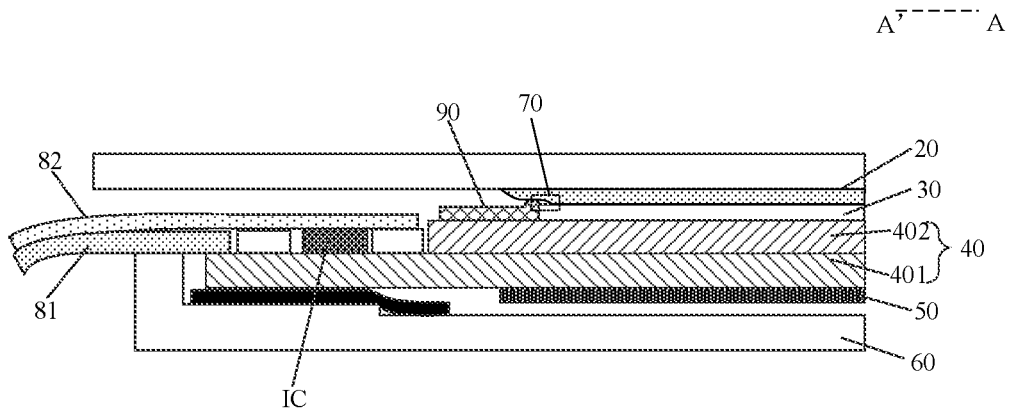
FIG. 14 is a sectional view of the display module in FIG. 11B along line A-A' according to some embodiments of the present disclosure.

The inventors have found that the provision of the conductive paste layer 90 may result in the generation of conductive paste bubbles, affecting the display effect. Referring to FIG. 14, the conductive paste layer 90 may exceed the first polarizer 30 by a certain height when being applied, and a space may be formed among the optical adhesive, the first polarizer 30 and the conductive paste layer 90 when the transparent cover plate 10, the optical adhesive layer 20 and the first polarizer 30 are attached, and if the optical adhesive layer 20 has an insufficient capability to absorb a level difference, i.e. the optical adhesive layer 20 cannot be completely filled, conductive paste bubbles 70 (refer to a dotted box in FIG. 12) which cannot be discharged may be generated. The light exiting the edge of the first polarizer 30 passes through the optical adhesive layer 20 and the transparent cover plate 10, and if the conductive paste bubbles can be directly observed (especially within a viewing angle of 45°), the display effect is adversely affected. In particular, in order to reduce the thickness of the module, when the thickness of the optical adhesive layer 20 is set to be less than or equal to 0.15 mm, the optical adhesive layer 20 has a poor capability to absorb the level difference in the conductive paste, and thus there is a high risk of generating bubbles in the conductive paste. When the thickness of the optical adhesive layer 20 is less than or equal to 0.1 mm, the risk of generating bubbles in the conductive paste is extremely high.

In some embodiments, in order to avoid the observation of conductive paste bubbles, the topography of the conductive paste layer 90 and a relative position of the end surface of the first polarizer 30 at the first side edge to the light-exiting region VA of the transparent cover plate 10 may be designed in such a manner that light at a position corresponding to the conductive paste bubble after being refracted cannot reach the light-exiting region VA of the transparent cover plate 10. Thus the conductive paste bubbles are in an invisible state.

The conductive paste layer 90 may include one or more conductive paste portions 900.

Figure 15:
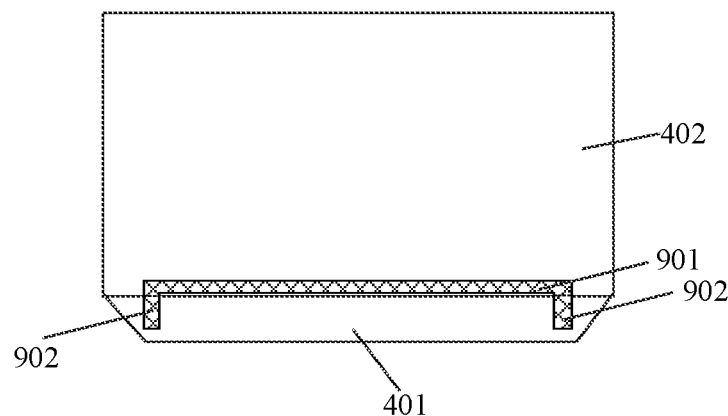
FIG. 15 is a schematic view showing a display module having a strip-shaped conductive paste according to one embodiment of the present disclosure.
Figure 16A:
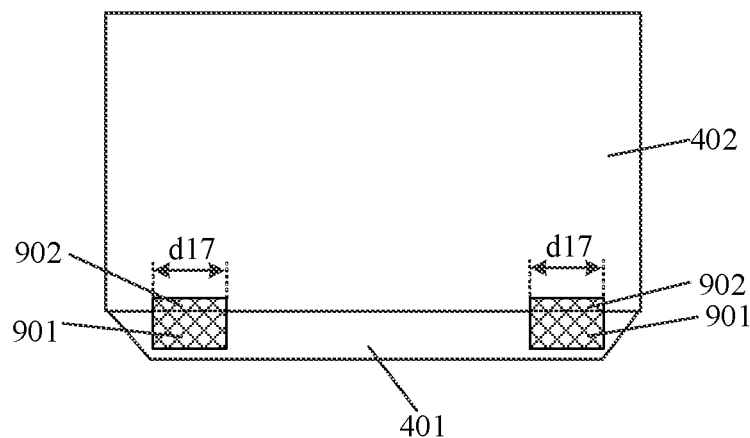
FIG. 16A is a schematic view showing a display module having a planar conductive paste according to one embodiment of the present disclosure.
Figure 16B:
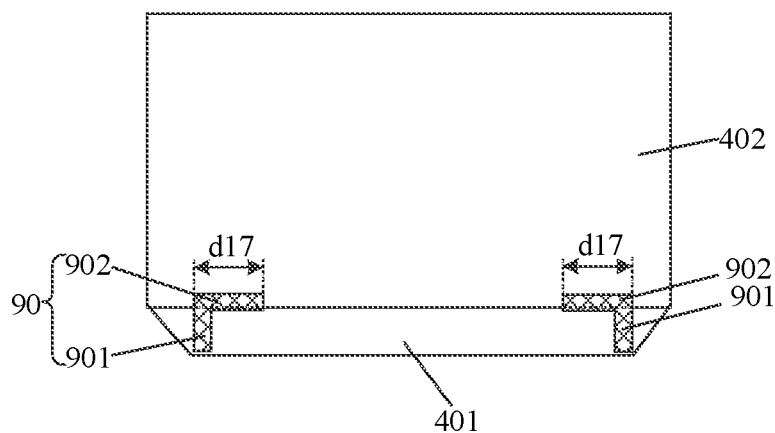
FIG. 16B is another schematic view showing a display module having a planar conductive paste according to one embodiment of the present disclosure.
Figure 16C:
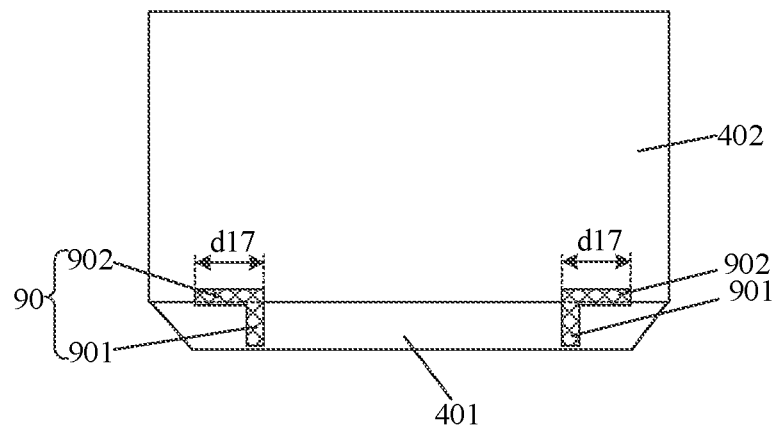
FIG. 16C is yet another schematic view showing a display module having a planar conductive paste according to one embodiment of the present disclosure.
Figure 16D:
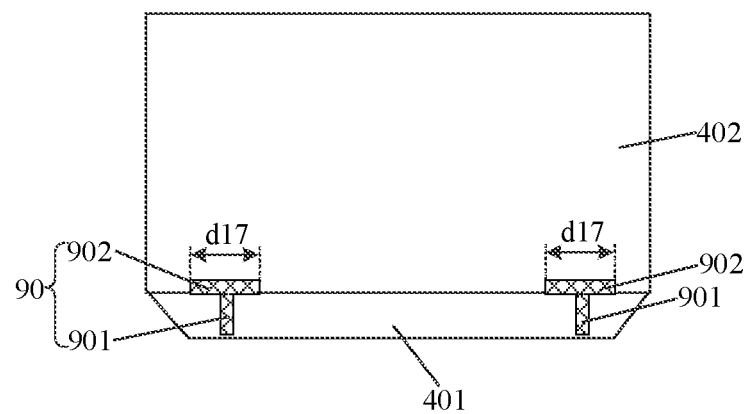
FIG. 16D is still yet another schematic view showing a display module having a planar conductive paste according to one embodiment of the present disclosure.
Figure 17:
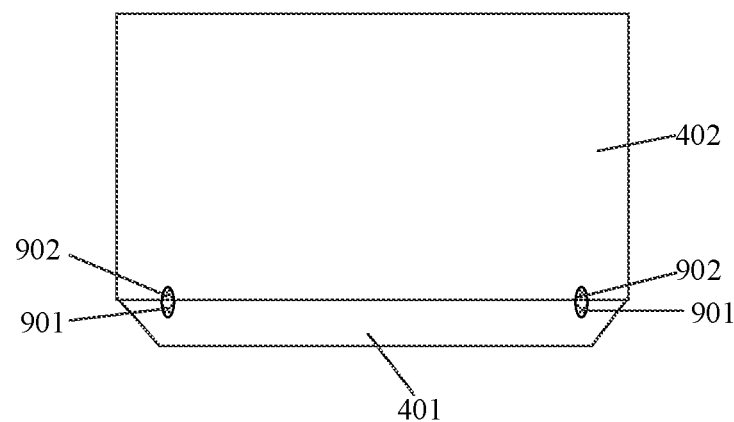
FIG. 17 is a schematic view showing a display module having a point-shaped conductive paste according to one embodiment of the present disclosure.

Referring to FIGS. 15-17, each conductive paste portion 900 includes a first conductive paste part 901 and a second conductive paste part 902 electrically connected to each other. The first conductive paste part 901 and the second conductive paste part 902 are both located on one side of the first substrate 401 away from the backlight module 60. For example, the first conductive paste part 901 is electrically connected to the first substrate 401. For example, the first conductive paste part 901 is in direct contact with the ground terminal of the first substrate 401. The second conductive paste part 902 is located on a side of the second substrate 402 away from the first substrate 401. The second conductive paste part 902 is in contact with the end surface of the first polarizer 30 at the first side edge. The first conductive paste part 901 is electrically connected to the second conductive paste part 902, so that static charges of the first polarizer 30 may be conducted out through the first conductive paste part 901 and the second conductive paste part 902. For example, the first conductive paste part 901 and the second conductive paste part 902 are formed as a one-piece structure. For example, the first conductive paste part 901 and the second conductive paste part 902 are formed through by a single adhesive-dispensing process.

The conductive paste portion 900 may be a strip-shaped conductive paste portion (refer to FIG. 15), a planar conductive paste portion (refer to FIGS. 16A-16D), or a point-shaped conductive paste portion (refer to FIG. 17).

For example, one or only one strip-shaped conductive paste portion is disposed in contact with the end surface of the first polarizer 30 at the first side edge. For example, there is no other conductive paste portion disposed in contact with the end surface of the first polarizer 30 at the first side edge. For example, FIG. 13A may represent a sectional view of the display module including only the first conductive paste part 901 in FIG. 15. For example, FIG. 13C may represent a sectional view of the display module including the first conductive paste part 901 and the second conductive paste part 902 in FIG. 15.

For example, one or only one planar conductive paste portion is provided in contact with the end surface of the first polarizer 30 at the first side edge. For example, there is no other conductive paste portion disposed in contact with the end surface of the first polarizer 30 at the first side edge.

For example, two or only two planar conductive paste portions are provided in contact with the end surface of the first polarizer 30 at the first side edge. For example, there is no other conductive paste portion disposed in contact with the end surface of the first polarizer 30 at the first side edge. For example, FIG. 13C may represent a sectional view of the display module including the first conductive paste part 901 and the second conductive paste part 902 in FIGS. 16A-D.

For example, one or only one point-shaped conductive paste portion is disposed in contact with the end surface of the first polarizer 30 at the first side edge. For example, there is no other conductive paste portion disposed in contact with the end surface of the first polarizer 30 at the first side edge.

For example, two or only two point-shaped conductive paste portions are disposed in contact with the end surface of the first polarizer 30 at the first side edge. For example, there is no other conductive paste portion disposed in contact with the end surface of the first polarizer 30 at the first side edge. For example, FIG. 13C may represent a sectional view of the display module including the first conductive paste part 901 and the second conductive paste part 902 in FIG. 17.

Referring to FIG. 15, the strip-shaped conductive paste portion 900 includes a second conductive paste part 902 continuously provided in a strip-like shape and a first conductive paste part 901 electrically connected to the second conductive paste part 902. The second conductive paste part 902 is disposed in contact with most of the end surface of the first polarizer 30 at the first side edge. For example, a length of the strip-shaped conductive paste portion 900 in contact with the end surface of the first polarizer 30 at the first side edge is more than half of the length of the end surface of the first side edge. For example, a position where the strip-shaped conductive paste portion 900 is in contact with the end surface of the first polarizer 30 at the first side edge includes a center of the end surface of the first side edge. The second conductive paste part 902 may be in sufficient contact with the first polarizer 30, so as to provide a good electrostatic charges export effect. For example, there are two first conductive paste parts 901 which may be electrically connected to both ends of the continuously strip-shaped second conductive paste parts 902, respectively.

Referring to FIGS. 16A-16D, the planar conductive paste portions 900 are locally distributed on the display panel 40. For example, a shape of a projection of the planar conductive paste portion onto the display panel 40 is one or more of rectangular (refer to FIG. 16A), L-like shape (refer to FIG. 16B, FIG. 16C), T-like shape (refer to FIG. 16D), circular and elliptical. For example, the position where the planar conductive paste layer 90 is in contact with the end surface of the first polarizer 30 at the first side edge is close to the second side edge adjacent to the first side edge. For example, the planar conductive paste layers 90 are distributed in the display region AA of the display panel 40 and arranged in the vicinity of two vertices of the first side edge of the display panel 40 respectively. For example, the quantity of the planar conductive paste portions 900 is two, and the two planar conductive paste portions are adjacent to one second side edge and the other second side edge adjacent to the first side edge, respectively. For example, a length of each of the planar conductive paste portions 900 in contact with the end surface of the first polarizer 30 at the first side edge is not more than a quarter of an entire length of the end surface of the first polarizer 30 at the first side edge. For example, the position where the planar conductive paste portion 900 is in contact with the end surface of the first polarizer 30 at the first side edge is not located at the center of the end surface of the first side edge. For example, the position where the planar conductive paste portion 900 is in contact with the end surface of the first polarizer 30 at the first side edge is away from the center of the end surface of the first side edge. For example, the length of the planar conductive paste portion 900 in contact with the end surface of the first polarizer 30 at the first side edge is more than 1.05 mm. For example, the length of the planar conductive paste portion 900 in contact with the end surface of the first polarizer 30 at the first side edge is in the range of 2 mm-5 mm. The length of the planar conductive paste portion 900 in contact with the end surface of the first polarizer 30 on the first side edge is small, so that the influence of the provision of the conductive paste layer 90 on the display effect can be reduced.

Referring to FIG. 17, a position where the point-shaped conductive paste portion 900 is in contact with the end surface of the first polarizer 30 at the first side edge is close to the second side edge adjacent to the first side edge. A length of each point-shaped conductive paste portion 900 in contact with the end surface of the first polarizer 30 at the first side edge is less than or equal to 1.05 mm, which may be taken as a distinguishing feature with respect to the planar conductive paste portion 900. For example, each of the point-shaped conductive paste portions 900 may be sized in such a manner that an orthographic projection of the point-shaped conductive paste portion 900 onto the first substrate 401 does not exceed a circle having a diameter of 1.05 mm. In this way, the flow of the point-shaped conductive paste portion 900 may be controlled when the point-shaped conductive paste portion 900 is fabricated, and thereby it is able to prevent the fabrication of the display module from being adversely affected by the point-shaped conductive paste portion 900 due to being excessively thick. For example, each of the point-shaped conductive paste portions 900 may be sized in such a manner that an area of the orthographic projection of the point-shaped conductive paste portion 900 onto the first substrate 401 is greater than or equal to a circle having a diameter of 0.75 mm, thereby ensuring the conduction effect and secure effect. For example, the orthographic projection of the point-shaped conductive paste portion 900 onto the first substrate 401 has a circular shape or an elliptical shape. For example, the point-shaped conductive paste portions 900 are distributed in the display region AA of the display panel 40 and arranged in the vicinity of two vertices of the first side edge of the display panel 40. For example, the quantity of the point-shaped conductive paste portions 900 is multiple. For example, the quantity of the point-shaped conductive paste layers 90 is two, and the two point-shaped conductive paste portions are adjacent to one second side edge and the other second side edge adjacent to the first side edge, respectively. For example, a position where the point-shaped conductive paste portion 900 is in contact with the end surface of the first polarizer 30 at the first side edge is not located at the center of the end surface of the first side edge. For example, the point-shaped conductive paste portion 900 is in contact with the end surface of the first polarizer 30 at the first side edge at a position away from the center of the end surface of the first side edge. A length of the point-shaped conductive paste portion 900 in contact with the end surface of the first polarizer 30 at the first side edge is small, so that the influence of the provision of the conductive paste layer 90 on the display effect can be reduced. For example, referring to FIG. 14, when the point-shaped conductive paste portion 900 is used for the electrostatic discharge, the display module includes a conductive member 82 electrically connected to the point-shaped conductive paste portion 900 and the flexible circuit board 81, and the electrostatic charges may be conducted to the flexible circuit board 81 through the conductive layer 82 and discharged through the flexible circuit board 81, so as to enhance the electrostatic discharge capability. For example, the conductive member 82 is located on the first substrate 401 and the flexible circuit board 81, the flexible circuit board 81 includes an exposed copper region, and the conductive member 82 is in contact with and electrically connected to the exposed copper region. For example, the conductive member 82 includes a copper foil. For example, the conductive member 82 covers all exposed copper regions of the flexible circuit board 81. For example, the conductive member 82 have a continuously distributed structure.

It should be appreciated that the conductive member 82 may also be provided when the linear conductive paste portion 900 and the planar conductive paste portion 900 are used for the electrostatic conducting, and an arrangement may refer to the structure in which the conductive member 82 is provided in the case of using the point-shaped conductive paste portion 900, which will not be described in detail herein.

The length of the conductive paste 900 in contact with the end surface of the first polarizer 30 at the first side edge may be understood as a length of the region where the conductive paste 900 is in contact with the end surface of the first polarizer 30 at the first side edge in a direction where the end surface extends. When the extension direction of the first side edge is the same as the extension direction of the end surface, the length of the region where the conductive paste portion 900 is in contact with the end surface of the first polarizer 30 at the first side edge is the length, in the extension direction of the first side edge, of the region where the conductive paste portion 900 is in contact with the end surface of the first polarizer 30 at the first side edge. The above illustrations regarding the length of the conductive paste 900 in contact with the end surface of the first polarizer 30 at the first side edge applies to any one case of the strip-shaped conductive paste portion, the planar conductive paste portion and the point-shaped conductive paste portion.

Referring to FIG. 13A, an orthographic projection of the optical adhesive layer 20 onto the display panel 40 is closer to the first side edge than a corresponding boundary of the display region AA at the side where the first side edge is located. A corresponding boundary of the orthographic projection of the optical adhesive layer 20 onto the display panel 40 at the side where the first side edge is located is closer to the first side edge than an orthographic projection of the boundary (i.e., a boundary between the light-exiting region VA and a non-transparent region UVA) of a light-exiting region of the cover plate 10 at the same side onto the display panel 40.

For example, the orthographic projection of the optical adhesive layer 20 onto the display panel 40 covers the display region AA.

For example, the orthographic projection of the optical adhesive layer 20 onto the display panel 40 covers an orthographic projection of the light-exiting region VA onto the display panel 40.

Referring to FIG. 13A, a distance between the orthographic projection of the optical adhesive layer 20 onto the display panel 40 relative to the corresponding boundary of the display region AA on the first side edge side and the boundary of the light-exiting region of the cover plate 10 at the same side is d12. In the present disclosure, d12 is less than or equal to 0.8 mm. Further, when d12 is too small, even if the shape of the conductive paste portion is designed, the conductive paste bubbles can be observed at a viewing angle of 45° or more. For example, d12 is greater than or equal to 0.4 mm. For example, d12 is greater than or equal to 0.7 mm. It should be noted that d12 is determined according to a final position to which the optical adhesive layer 20 extends after the optical adhesive layer 20 is attached in the display device. Before the optical adhesive layer 20 is attached, a distance between the orthographic projection of the optical adhesive layer 20 onto the display panel 40 relative to the corresponding boundary of the display region AA on the first side edge side and the boundary of the light-exiting region of the cover plate 10 at the same side may be defined as d12', which represents a theoretical design value. The d12' may be set to be less than or equal to 0.6 mm. For example, d12' may be set to be greater than or equal to 0.5 mm.

Referring to FIG. 13A, a distance between an orthographic projection of the end surface of the first polarizer 30 onto the display panel 40 at the first side edge and the boundary (i.e., the boundary between the light-exiting region VA and the non-transparent region UVA) of the light-exiting region of the cover plate 10 at the same side is d15.

In some embodiments, d15 is greater than or equal to 1.05 mm, and the conductive paste layer 90 includes at least one kind of the strip-shaped conductive paste portion 900 and the planar conductive paste portion 900. For example, the conductive paste layer 90 only includes the strip-shaped conductive paste portion 900. For example, the conductive paste layer 90 only includes the planar conductive paste portion 900. For example, the conductive paste layer 90 has a shape of the stripe-shaped conductive paste layer 90 as shown in FIG. 15. For example, the conductive paste layer 90 has a shape of the planar conductive paste layer 90 as shown in any one of FIGS. 16A to 16D. Since a boundary of the conductive paste layer 90 is in contact with the end surface of the first polarizer 30 at the first side edge but does not overlap with a surface of the first polarizer 30 away from the display panel 40 or only overlaps with the surface of the first polarizer 30 away from the display panel 40 at a narrow width, when d15 is greater than or equal to 1.05 mm, it is difficult to generate conductive paste bubbles for the optical adhesive layer 20 cooperating with the paste layer 90, or, even if the conductive paste bubbles are generated, locations of the conductive paste bubbles are far away from the light-exiting region VA, and thus it is difficult to affect the display effect. Therefore, the strip-shaped conductive paste portion 900 can be selected to increase an effective contact length of the conductive paste layer 90 with the first polarizer 30, so as to increase the conductive effect. In this case, for example, d12 is in the range of 0.4 mm to 0.8 mm. For example, d12 is in the range of 0.7 mm to 0.8 mm.

In some embodiments, d15 is greater than or equal to 0.9 mm and less than 1.05 mm, and the conductive paste layer 90 includes the planar conductive paste portion 900. For example, the conductive paste layer 90 only includes the planar conductive paste portion 900. For example, the conductive paste layer 90 includes two planar conductive paste portions 900, and the two planar conductive paste layers 900 are distributed in the display region AA of the display panel 40 and arranged in the vicinity of two vertices of the first side edge of the display panel 40 respectively. For example, the conductive paste layer 90 has a shape of the planar conductive paste layer 90 as shown in any one of FIGS. 16A to 16D. Since the boundary of the conductive paste layer 90 is in contact with the end surface of the first polarizer 30 at the first side edge and does not overlap, or overlaps only at a narrow width, with the surface of the first polarizer 30 away from the display panel 40, when d15 is greater than or equal to 0.9 mm and less than 1.05 mm, the use of the linear conductive paste portion may make the conductive paste bubble easy to be observed due to the large length of the linear conductive paste portion in contact with the end surface of the first polarizer 30 at the first side edge. Therefore, when the planar conductive paste portion 900 is used, it is able to ensure the electrostatic charges conducting effect while the conductive paste bubble is not easily observed. In this case, for example, d12 is in the range of 0.4 mm to 0.8 mm. For example, d12 is in the range of 0.7 mm to 0.8 mm. For example, the length d17 of each conductive paste portion 900 in contact with the end surface of the first polarizer 30 at the first side edge is in the range of 2 mm-5 mm. For example, to ensure the conducting effect, d17 is 3.5 mm.

In some embodiments, d15 is less than 0.9 mm and the conductive paste layer 90 includes the point-shaped conductive paste portion 900. For example, the conductive paste layer 90 only includes the point-shaped conductive paste portion 900. For example, the conductive paste layer 90 includes two point-shaped conductive paste portions 900, and the two point-shaped conductive paste layers 900 are distributed in the display region AA of the display panel 40 and arranged in the vicinity of two vertices of the first side edge of the display panel 40 respectively. For example, the conductive paste layer 90 has a shape of the planar conductive paste layer 90 as shown in FIG. 17. The boundary of the conductive paste layer 90 is in contact with the end surface of the first polarizer 30 at the first side edge and does not overlap, or overlaps only at a narrow width, with the surface of the first polarizer 30 away from the display panel 40, when d15 is less than 0.9 mm, conductive paste bubbles are more easily observed as compared with that d15 is greater than or equal to 0.9 mm. Therefore, when the point-shaped conductive paste portion 900 is used, it is able to effectively reduce or avoid the influence of the conductive paste bubbles on the display effect. For example, d15 is greater than or equal to 0.6 mm. For example, d12 is in the range of 0.4 mm to 0.8 mm. For example, d12 is in the range of 0.7 mm to 0.8 mm. It has been verified through experiments that, when the d15 length is set, results of the type of the conductive paste layer 90 and whether bubbles can be observed at a viewing angle of 45° are shown in Table 1.

shaped conductive paste layer' represents using the conductive paste layer structure in FIG. 15, the 'planar conductive paste layer' represents the conductive paste layer structure as shown in FIG. 16B or FIG. 16C, and the 'point-shaped conductive paste layer' means that the conductive paste layer structure in FIG. 17 is used. It can be seen from the above-mentioned results that adjusting the shape of the conductive paste layer according to d15 can prevent the conductive paste bubbles from being visible and thereby to improve the display effect.

In a specific embodiment, referring to FIGS. 16A-16D, the conductive paste layer 90 only includes two planar conductive paste portions 900, and the two planar conductive paste layers 900 are distributed in the display region AA of the display panel 40 and arranged in the vicinity of two vertices of the first side edge of the display panel 40 respectively. The length d17 of each conductive paste portion 900 in contact with the end surface of the first polarizer 30 at the first side edge is in the range of 2 mm-5 mm. For example, d12=0.7 mm. For example, d13=0.4 mm.

In addition, embodiments of the present disclosure further provide a display device including the above-described display module. The display module provided in the embodiments of the present disclosure may be any product or member having a display function, such as a television, a display, a digital photo frame, a mobile phone, a tablet computer, etc.

It should be further appreciated that, the above embodiments have been described in a progressive manner, and the same or similar contents in the embodiments have not been repeated, i.e., each embodiment has merely focused on the difference from the others. Especially, the product embodiments are substantially similar to the method embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the quantity thereof. Such words as "include" or "including" intends to indicate that an element or object before the word contains an element or object or equivalents thereof listed

TABLE 1

Conductive Paste Bubble Verification Results

| Item | d15 (mm) | d13 (mm) | d12' (mm) | d16 (mm) | Conductive paste layer shape | Results |
|---|---|---|---|---|---|---|
| 1 | 1.4 | 0.8 | 0.6 | 0.45 | Strip-shaped conductive paste layer | OK |
| 2 | 1.3 | 0.7 | 0.6 | 0.45 | Strip-shaped conductive paste layer | OK |
| 3 | 1.2 | 0.6 | 0.6 | 0.45 | Strip-shaped conductive paste layer | OK |
| 4 | 1.05 | 0.55 | 0.5 | 0.45 | Strip-shaped conductive paste layer | OK |
| 5 | 1.0 | 0.5 | 0.5 | 0.45 | Strip-shaped conductive paste layer | bubble |
| 6 | 1.0 | 0.5 | 0.5 | 0.6 | Planar conductive paste layer | OK |
| 7 | 0.95 | 0.45 | 0.5 | 0.6 | Planar conductive paste layer | OK |
| 8 | 0.9 | 0.4 | 0.5 | 0.6 | Planar conductive paste layer | OK |
| 9 | 0.85 | 0.35 | 0.5 | 0.6 | Planar conductive paste layer | bubble |
| 10 | 0.85 | 0.35 | 0.5 | 0.6 | Point-shaped conductive paste layer | OK |
| 11 | 0.8 | 0.3 | 0.5 | 0.3 | Point-shaped conductive paste layer | OK |
| 12 | 0.7 | 0.2 | 0.5 | 0.3 | Point-shaped conductive paste layer | OK |

The result 'OK' in Table 1 indicates that the conductive paste bubble is not visible, and the 'bubble' indicates that the conductive paste bubble is in a visible state. The 'stripafter the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are preferred embodiments of the present disclosure, it should be appreciated that those skilled in the art may make various improvements and modifications without departing from the principle of the present disclosure, and theses improvement and modifications shall fall within the scope of the present disclosure.

What is claimed is:

1. A display module, comprising a transparent cover plate, an optical adhesive layer, a display panel and a backlight module arranged sequentially;
    wherein a side edge of the display module comprises a first contour edge on a same side as a first side edge of the display panel on the display module and a plurality of second contour edges other than the first contour edge, wherein the first side edge of the display panel is on a side where a data input end of the display panel is located;
    wherein the display module further comprises a side adhesive, and the side adhesive is arranged on a side of at least one of the second contour edges away from a center of the display panel; the side adhesive extends from the transparent cover plate to the backlight module, and the side adhesive is adhered to a side surface of the display panel, a side surface of the backlight module and a side surface of the transparent cover plate facing the display panel.

2. The display module according to claim 1, wherein on a side where at least one of the second contour edges is located, an edge of the transparent cover plate protrudes with respect to a corresponding second contour edge of the display panel, and the side adhesive is located on a side of the transparent cover plate close to the display panel.

3. The display module according to claim 1, wherein the display module comprises one or more second light-shielding layers located between the display panel and the backlight module, the second light-shielding layers are arranged at the second contour edges respectively and in contact with the backlight module, and a contact width is greater than or equal to 0.15 mm.

4. The display module according to claim 1, wherein a side edge of the display panel at a side where at least one second contour edge is located is indented inwardly relative to an outer contour of the backlight module, and a length of the backlight module protruding with respect to the display panel is less than or equal to 0.15 mm.

5. The display module according to claim 1, wherein on at least one of the second contour edges, the side adhesive covers an end portion of the display panel with a width in a range of 0.15 mm to 0.25 mm.

6. The display device according to claim 1, wherein an orthographic projection of an edge of the backlight module corresponding to a side where at least one second contour edge is located onto an extending plane of the transparent cover plate is closer to the second contour edge of the display module than an orthographic projection of an edge of the second light-shielding layer close to the corresponding second contour edge onto the extending plane of the transparent cover plate;
    wherein the second light-shielding layer is indented inwardly by 0.05 mm or less relative to the backlight module.

7. The display module according to claim 1, wherein in a direction perpendicular to the transparent cover plate, a length of an overlapping region between the side adhesive and the backlight module is greater than or equal to half a thickness of the backlight module.

8. The display module according to claim 1, wherein a thickness of the second light-shielding layer is in the range of 0.027 mm to 0.033 mm.

9. The display module according to claim 1, wherein the display panel comprises a first substrate, a second substrate and a sealant located between the first substrate and the second substrate; the data input end is located on the first substrate;
    wherein the display panel comprises a support structure, and the support structure is located on a side of the sealant away from a display region of the display panel.

10. The display module according to claim 9, wherein the second substrate comprises a first edge, the first substrate comprises a second edge, both the first edge and the second edge are located at the first side edge of the display panel, and the first edge is closer to the display region of the display panel than the second edge;
    wherein a boundary of the support structure away from the display region of the display panel is flush with the first edge.

11. The display module according to claim 10, wherein a distance between the second edge and the boundary of the support structure close to the sealant in a direction perpendicular to the second edge on an extending plane of the display panel is greater than or equal to 0.05 mm;
    and/or,
    wherein a distance between the first edge and the sealant is in the range of 0.05 mm to 0.12 mm.

12. The display module according to claim 9, wherein the support structure is disposed in contact with the first substrate and the second substrate;
    and/or,
    wherein a thickness of the display panel is less than 0.25 mm.

13. The display module according to claim 1, wherein the display module comprises a first polarizer located between the optical adhesive layer and the display panel;
    the display panel comprises a first substrate and a second substrate, and the data input end is located on the first substrate;
    the display panel further comprises a conductive paste layer, and the conductive paste layer is electrically connected to an end surface of the first polarizer at the first side edge and the first substrate; a thickness of the conductive paste layer at a position where the conductive paste layer is in contact with the end surface of the first polarizer at the first side edge is greater than a thickness of the first polarizer;
    the conductive paste layer comprises one strip-shaped conductive paste portion, or a plurality of planar conductive paste portions, or one or more point-shaped conductive paste portions; each conductive paste portion comprises a first conductive paste part and a second conductive paste part which are electrically connected to each other, and both the first conductive paste part and the second conductive paste part are located on one side of the first substrate away from the backlight module; the first conductive paste part is electrically connected to the first substrate, and the second conductive paste part is located on a side of the second substrate away from the first substrate and is arranged in contact with the end surface of the first polarizer at the first side edge;

wherein the strip-shaped conductive paste portion comprises a continuously strip-shaped second conductive paste part, and the second conductive paste part is arranged in contact with most positions of the end surface of the first polarizer at the first side edge; a length of at least one planar conductive paste portion in contact with the end surface of the first polarizer at the first side edge is in the range of 2 mm-5 mm; a length of the point-shaped conductive paste portion in contact with the end surface of the first polarizer at the first side edge is less than or equal to 1.05 mm.

14. The display module according to claim 13, wherein a distance between an orthographic projection of the end surface of the first polarizer at the first side edge onto the display panel and a boundary of a light-exiting region of the cover plate at the same side is greater than or equal to 1.05 mm, and the conductive paste layer comprises at least one of the strip-shaped conductive paste portion and the planar conductive paste portions;

or, wherein a distance between an orthographic projection of the end surface of the first polarizer at the first side edge onto the display panel and a boundary of a light-exiting region of the cover plate at the same side is greater than or equal to 0.9 mm and less than 1.05 mm, and the conductive paste layer only comprises the planar conductive paste portions.

15. The display module according to claim 14, wherein the conductive paste layer only comprises two planar conductive paste portions close to a side edge of the display panel adjacent to the first side edge and another side edge of the display panel adjacent to the first side edge, respectively.

16. The display module according to claim 13, wherein a distance between an orthographic projection of the end surface of the first polarizer at the first side edge onto the display panel and a boundary of a light-exiting region of the cover plate at the same side is less than 0.9 mm, and the conductive paste layer only comprises the point-shaped conductive paste portion.

17. The display module according to claim 16, wherein the conductive paste layer only comprises two point-shaped conductive paste portions close to a side edge of the display panel adjacent to the first side edge and another side edge of the display panel adjacent to the first side edge, respectively;

wherein the display module comprises a conductive member and a flexible circuit board, wherein the flexible circuit board is electrically connected to the data input end, and the conductive member is electrically connected to the point-shaped conductive paste portion and the flexible circuit board; the conductive member comprises a conductive copper foil.

18. The display module according to claim 13, wherein a thickness of the optical adhesive layer is less than or equal to 0.15 mm.

19. The display module according to claim 13, wherein a distance from an orthographic projection of the optical adhesive layer onto the display panel relative to a corresponding boundary of a display region of the display panel at the side where the first side edge is located to a boundary of a light-exiting region of the cover plate at the same side is greater than or equal to 0.232 mm and less than or equal to 0.6 mm.

20. A display device comprising the display module according to claim 1.

* * * * *